United States Patent
Hall et al.

(10) Patent No.: US 12,215,747 B1
(45) Date of Patent: Feb. 4, 2025

(54) VIBRATION CONTROL SYSTEM

(71) Applicants: Jonathan L. Hall, Menlo Park, CA (US); Islam Mohsen Shawki, Sunnyvale, CA (US); Jacob L. Dawson, Sunnyvale, CA (US)

(72) Inventors: Jonathan L. Hall, Menlo Park, CA (US); Islam Mohsen Shawki, Sunnyvale, CA (US); Jacob L. Dawson, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/381,482

(22) Filed: Oct. 18, 2023

Related U.S. Application Data

(63) Continuation of application No. 17/308,131, filed on May 5, 2021, now Pat. No. 11,828,339.
(Continued)

(51) Int. Cl.
  *F16D 65/00* (2006.01)
  *F16D 55/226* (2006.01)
  (Continued)

(52) U.S. Cl.
  CPC ....... *F16D 65/0018* (2013.01); *F16D 55/226* (2013.01); *F16D 65/0062* (2013.01);
  (Continued)

(58) Field of Classification Search
  CPC ............. F16D 65/0012; F16D 65/0018; F16D 55/226; F16D 65/0062; F16D 65/0068;
  (Continued)

(56) References Cited

U.S. PATENT DOCUMENTS

| | | | |
|---|---|---|---|
| 2,537,479 | A | 1/1951 | Motte |
| 2,757,938 | A | 8/1956 | Crowder |

(Continued)

FOREIGN PATENT DOCUMENTS

| | | |
|---|---|---|
| CN | 108215946 A | 6/2018 |
| CN | 208439009 U | 1/2019 |

(Continued)

OTHER PUBLICATIONS

Monroe Intelligent Suspension, "CVSA2/Kinetic: Low Energy For High Performance", www.monroeintelligentsuspension.com/products/cvsa2-kinetic/, Date Unknown, Downloaded Mar. 2, 2017, 2 pp.
(Continued)

*Primary Examiner* — Thomas W Irvin
(74) *Attorney, Agent, or Firm* — Young Basile Hanlon & MacFarlane, P.C.

(57) ABSTRACT

An apparatus includes a retainer, a rotational portion that is connected to the retainer so that it is able to rotate with respect to the retainer on a rotation axis, a rotor that is connected to the rotational portion for rotation in unison with the rotational portion, and a caliper assembly that is connected to the retainer so that the caliper assembly is able to move according to a line of action. The apparatus also includes a damper assembly that is connected to the retainer and is connected to the caliper assembly to regulate movement of the caliper assembly with respect to the retainer along the line of action, wherein the caliper assembly and the damper assembly cooperate to define a mass damper system that damps vibration of the rotational portion.

20 Claims, 9 Drawing Sheets

Related U.S. Application Data

(60) Provisional application No. 63/048,795, filed on Jul. 7, 2020.

(51) Int. Cl.
*F16D 65/18* (2006.01)
*F16D 69/02* (2006.01)
*F16D 55/00* (2006.01)

(52) U.S. Cl.
CPC .......... *F16D 65/0068* (2013.01); *F16D 65/18* (2013.01); *F16D 69/025* (2013.01); *F16D 2055/0012* (2013.01); *F16D 2055/0016* (2013.01)

(58) Field of Classification Search
CPC ................... F16D 65/18; F16D 69/025; F16D 2055/0012; F16D 2055/0016; F16D 65/123; F16D 65/127
See application file for complete search history.

(56) References Cited

U.S. PATENT DOCUMENTS

| | | |
|---|---|---|
| 2,901,239 A | 8/1959 | Sethna |
| 2,913,252 A | 11/1959 | Norrie |
| 2,955,841 A | 10/1960 | Faiver et al. |
| 3,089,710 A | 5/1963 | Ernest |
| 3,231,058 A * | 1/1966 | Batchelor ............. F16D 13/648 |
| | | 188/218 XL |
| 3,236,334 A | 2/1966 | Wallerstein, Jr. |
| 3,322,379 A | 5/1967 | Flannelly |
| 3,368,824 A | 2/1968 | Julien |
| 3,441,238 A | 4/1969 | Flannelly |
| 3,781,032 A | 12/1973 | Jones |
| 3,970,162 A | 7/1976 | Le Salver et al. |
| 4,206,935 A | 6/1980 | Sheppard et al. |
| 4,379,572 A | 4/1983 | Hedenberg |
| 4,530,514 A | 7/1985 | Ito |
| 4,537,420 A | 8/1985 | Ito et al. |
| 4,589,678 A | 5/1986 | Lund |
| 4,613,152 A | 9/1986 | Booher |
| 4,614,359 A | 9/1986 | Lundin et al. |
| 4,634,142 A | 1/1987 | Woods et al. |
| 4,637,628 A | 1/1987 | Perkins |
| 4,643,270 A | 2/1987 | Beer |
| 4,656,409 A | 4/1987 | Shimizu |
| 4,659,106 A | 4/1987 | Fujita et al. |
| 4,784,378 A | 11/1988 | Ford |
| 4,834,416 A | 5/1989 | Shimoe et al. |
| 4,877,098 A | 10/1989 | Asanuma |
| 4,893,832 A | 1/1990 | Booher |
| 4,922,159 A | 5/1990 | Phillips et al. |
| 4,926,978 A | 5/1990 | Shibata et al. |
| 4,960,290 A | 10/1990 | Bose |
| 4,981,309 A | 1/1991 | Froeschle et al. |
| 4,991,698 A * | 2/1991 | Hanson .................... B60G 3/01 |
| | | 267/221 |
| 5,027,048 A | 6/1991 | Masrur et al. |
| 5,033,028 A | 7/1991 | Browning |
| 5,060,959 A | 10/1991 | Davis et al. |
| 5,103,942 A * | 4/1992 | Schmitt ................... F16D 69/00 |
| | | 188/251 A |
| 5,172,930 A | 12/1992 | Boye et al. |
| 5,244,053 A | 9/1993 | Kashiwagi |
| 5,251,926 A | 10/1993 | Aulerich et al. |
| 5,364,081 A | 11/1994 | Hartl |
| 5,392,882 A | 2/1995 | Mackovjak et al. |
| 5,401,053 A | 3/1995 | Sahm et al. |
| 5,409,254 A | 4/1995 | Minor et al. |
| 5,468,055 A | 11/1995 | Simon et al. |
| 5,507,518 A | 4/1996 | Nakahara et al. |
| 5,517,414 A | 5/1996 | Hrovat |
| 5,612,110 A * | 3/1997 | Watremez ............. F16D 69/027 |
| | | 428/614 |
| 5,645,250 A | 7/1997 | Gevers |
| 5,678,847 A | 10/1997 | Izawa et al. |
| 5,785,345 A | 7/1998 | Barlas et al. |
| 5,810,335 A | 9/1998 | Wirtz et al. |
| 5,829,764 A | 11/1998 | Griffiths |
| 5,880,542 A | 3/1999 | Leary et al. |
| 6,032,770 A | 3/2000 | Alcone et al. |
| 6,113,119 A | 9/2000 | Laurent et al. |
| 6,142,494 A | 11/2000 | Higuchi |
| 6,152,267 A * | 11/2000 | Iwai ....................... B62K 25/16 |
| | | 188/26 |
| 6,170,838 B1 | 1/2001 | Laurent et al. |
| 6,233,510 B1 | 5/2001 | Platner et al. |
| 6,249,728 B1 | 6/2001 | Streiter |
| 6,260,869 B1 * | 7/2001 | Hanlon .................. B62K 25/16 |
| | | 188/26 |
| 6,276,710 B1 | 8/2001 | Sutton |
| 6,314,353 B1 | 11/2001 | Ohsaku et al. |
| 6,357,770 B1 | 3/2002 | Carpiaux et al. |
| 6,364,078 B1 * | 4/2002 | Parison .................... F16F 7/116 |
| | | 188/380 |
| 6,443,436 B1 | 9/2002 | Schel |
| 6,470,248 B2 | 10/2002 | Shank et al. |
| 6,502,837 B1 | 1/2003 | Hamilton et al. |
| 6,513,819 B1 | 2/2003 | Oliver et al. |
| 6,634,445 B2 | 10/2003 | Dix et al. |
| 6,637,561 B1 | 10/2003 | Collins et al. |
| 6,873,891 B2 | 3/2005 | Moser et al. |
| 6,926,288 B2 | 8/2005 | Bender |
| 6,940,248 B2 | 9/2005 | Maresca et al. |
| 6,945,541 B2 | 9/2005 | Brown |
| 7,017,690 B2 | 3/2006 | Burke |
| 7,032,723 B2 | 4/2006 | Quaglia et al. |
| 7,051,851 B2 | 5/2006 | Svartz et al. |
| 7,140,601 B2 | 11/2006 | Nesbitt et al. |
| 7,195,250 B2 | 3/2007 | Knox et al. |
| 7,202,577 B2 | 4/2007 | Parison et al. |
| 7,302,825 B2 | 12/2007 | Knox |
| 7,308,351 B2 | 12/2007 | Knoop et al. |
| 7,392,997 B2 | 7/2008 | Sanville et al. |
| 7,401,794 B2 | 7/2008 | Laurent et al. |
| 7,421,954 B2 | 9/2008 | Bose |
| 7,427,072 B2 | 9/2008 | Brown |
| 7,484,744 B2 | 2/2009 | Galazin et al. |
| 7,502,589 B2 | 3/2009 | Howard et al. |
| 7,543,825 B2 | 6/2009 | Yamada |
| 7,551,749 B2 | 6/2009 | Rosen et al. |
| 7,597,169 B2 * | 10/2009 | Borroni-Bird ........... B62D 7/18 |
| | | 280/124.1 |
| 7,641,010 B2 | 1/2010 | Mizutani et al. |
| 7,644,938 B2 | 1/2010 | Yamada |
| 7,654,540 B2 | 2/2010 | Parison et al. |
| 7,734,384 B2 | 6/2010 | Konopa et al. |
| 7,818,109 B2 | 10/2010 | Scully |
| 7,823,891 B2 | 11/2010 | Bushko et al. |
| 7,899,607 B2 | 3/2011 | Shin et al. |
| 7,932,684 B2 | 4/2011 | O'Day et al. |
| 7,962,261 B2 | 6/2011 | Bushko et al. |
| 7,963,529 B2 | 6/2011 | Oteman et al. |
| 7,976,038 B2 | 7/2011 | Gregg |
| 8,047,551 B2 | 11/2011 | Morris et al. |
| 8,067,863 B2 | 11/2011 | Giovanardi |
| 8,095,268 B2 | 1/2012 | Parison et al. |
| 8,099,213 B2 | 1/2012 | Zhang et al. |
| 8,109,371 B2 | 2/2012 | Kondo et al. |
| 8,112,198 B2 | 2/2012 | Parison, Jr. et al. |
| 8,113,522 B2 | 2/2012 | Oteman et al. |
| 8,127,900 B2 | 3/2012 | Inoue |
| 8,157,036 B2 | 4/2012 | Yogo et al. |
| 8,191,874 B2 | 6/2012 | Inoue et al. |
| 8,282,149 B2 | 10/2012 | Kniffin et al. |
| 8,336,319 B2 | 12/2012 | Johnston et al. |
| 8,356,861 B2 | 1/2013 | Kniffin et al. |
| 8,360,387 B2 | 1/2013 | Breen et al. |
| 8,370,022 B2 | 2/2013 | Noue et al. |
| 8,387,762 B2 | 3/2013 | Kondo et al. |
| 8,417,417 B2 | 4/2013 | Chen et al. |
| 8,428,305 B2 | 4/2013 | Zhang et al. |
| 8,466,639 B2 | 6/2013 | Parison, Jr. et al. |

(56) References Cited

U.S. PATENT DOCUMENTS

| | | | |
|---|---|---|---|
| 8,474,801 B2 | 7/2013 | Ishiguro et al. | |
| 8,490,761 B2 | 7/2013 | Kondo | |
| 8,499,903 B2 | 8/2013 | Sakuta et al. | |
| 8,525,453 B2 | 9/2013 | Ogawa | |
| 8,548,678 B2 | 10/2013 | Ummethala et al. | |
| 8,579,311 B2 | 11/2013 | Butlin, Jr. et al. | |
| 8,598,831 B2 | 12/2013 | Ogawa et al. | |
| 8,632,078 B2 | 1/2014 | Ehrlich et al. | |
| 8,641,052 B2 | 2/2014 | Kondo et al. | |
| 8,641,053 B2 | 2/2014 | Pare et al. | |
| 8,668,060 B2 | 3/2014 | Kondo et al. | |
| 8,682,530 B2 | 3/2014 | Nakamura | |
| 8,701,845 B2 | 4/2014 | Kondo | |
| 8,725,351 B1 | 5/2014 | Selden et al. | |
| 8,744,680 B2 | 6/2014 | Rieger et al. | |
| 8,744,694 B2 | 6/2014 | Ystueta | |
| 8,757,309 B2 | 6/2014 | Schmitt et al. | |
| 8,783,430 B2 | 7/2014 | Brown | |
| 8,890,461 B2 | 11/2014 | Knox et al. | |
| 8,930,074 B1 | 1/2015 | Lin | |
| 8,938,333 B2 | 1/2015 | Bose et al. | |
| 9,033,121 B2 | 5/2015 | Kazmirski et al. | |
| 9,038,271 B2 * | 5/2015 | Huang | B22D 19/0081 |
| | | | 29/894.32 |
| 9,062,737 B2 | 6/2015 | Hoult | |
| 9,062,983 B2 | 6/2015 | Zych | |
| 9,079,473 B2 | 7/2015 | Lee et al. | |
| 9,102,209 B2 | 8/2015 | Giovanardi et al. | |
| 9,291,300 B2 | 3/2016 | Parker et al. | |
| 9,316,667 B2 | 4/2016 | Ummethala et al. | |
| 9,349,304 B2 | 5/2016 | Sangermano et al. | |
| 9,399,384 B2 | 7/2016 | Lee et al. | |
| 9,428,029 B2 | 8/2016 | Job | |
| 9,533,539 B2 | 1/2017 | Eng et al. | |
| 9,550,495 B2 | 1/2017 | Tatourian et al. | |
| 9,625,902 B2 | 4/2017 | Knox | |
| 9,643,467 B2 | 5/2017 | Selden et al. | |
| 9,676,244 B2 | 6/2017 | Giovanardi et al. | |
| 9,702,349 B2 | 7/2017 | Anderson et al. | |
| 9,821,835 B2 * | 11/2017 | Ferrer-Dalmau Nieto | |
| | | | B62D 5/26 |
| 9,855,887 B1 | 1/2018 | Potter et al. | |
| 9,868,332 B2 | 1/2018 | Anderson et al. | |
| 9,884,545 B1 | 2/2018 | Addanki et al. | |
| 9,909,644 B2 | 3/2018 | Cegar et al. | |
| 9,975,391 B2 | 5/2018 | Tseng et al. | |
| 10,054,203 B2 | 8/2018 | Fida | |
| 10,065,474 B2 | 9/2018 | Trangbaek | |
| 10,081,408 B2 | 9/2018 | Yoshida | |
| 10,093,145 B1 | 10/2018 | Vaughan et al. | |
| 10,245,984 B2 | 4/2019 | Parker et al. | |
| 10,300,760 B1 | 5/2019 | Aikin et al. | |
| 10,315,481 B2 | 6/2019 | Lu et al. | |
| 10,377,371 B2 | 8/2019 | Anderson et al. | |
| 10,378,599 B2 | 8/2019 | Mettrick et al. | |
| 10,407,035 B1 | 9/2019 | Gadda et al. | |
| 10,513,161 B2 | 12/2019 | Anderson et al. | |
| 10,960,723 B1 | 3/2021 | Hall et al. | |
| 11,078,981 B2 | 8/2021 | Zhang et al. | |
| 11,285,773 B1 * | 3/2022 | Hall | B60G 17/0161 |
| 11,634,167 B1 | 4/2023 | Dowle et al. | |
| 11,828,339 B1 | 11/2023 | Hall et al. | |
| 12,054,028 B1 | 8/2024 | Carter et al. | |
| 2001/0045719 A1 | 11/2001 | Smith | |
| 2002/0190486 A1 | 12/2002 | Phillis et al. | |
| 2003/0030241 A1 | 2/2003 | Lawson | |
| 2003/0080526 A1 | 5/2003 | Conover | |
| 2004/0054455 A1 | 3/2004 | Voight et al. | |
| 2004/0074720 A1 | 4/2004 | Thieltges | |
| 2004/0094912 A1 | 5/2004 | Niwa et al. | |
| 2004/0226788 A1 | 11/2004 | Tanner | |
| 2004/0245732 A1 | 12/2004 | Kotulla et al. | |
| 2005/0051986 A1 | 3/2005 | Galazin et al. | |
| 2005/0096171 A1 | 5/2005 | Brown et al. | |
| 2005/0199457 A1 | 9/2005 | Beck | |
| 2005/0206231 A1 | 9/2005 | Lu et al. | |
| 2005/0211516 A1 | 9/2005 | Kondo et al. | |
| 2005/0230170 A1 * | 10/2005 | Robinson | B60G 17/056 |
| | | | 180/227 |
| 2005/0241899 A1 * | 11/2005 | Rutz | B60G 13/16 |
| | | | 188/379 |
| 2005/0247496 A1 | 11/2005 | Nagaya | |
| 2006/0043804 A1 | 3/2006 | Kondou | |
| 2006/0076828 A1 | 4/2006 | Lu et al. | |
| 2006/0119064 A1 | 6/2006 | Mizuno et al. | |
| 2006/0181034 A1 | 8/2006 | Wilde et al. | |
| 2006/0266599 A1 | 11/2006 | Denys et al. | |
| 2006/0273530 A1 | 12/2006 | Zuber | |
| 2007/0045036 A1 | 3/2007 | Takeuchi et al. | |
| 2007/0069496 A1 | 3/2007 | Rinehart et al. | |
| 2007/0107959 A1 | 5/2007 | Suzuki et al. | |
| 2007/0114706 A1 | 5/2007 | Myers | |
| 2007/0199750 A1 | 8/2007 | Suzuki et al. | |
| 2007/0210539 A1 | 9/2007 | Hakui et al. | |
| 2008/0017462 A1 | 1/2008 | Mizutani et al. | |
| 2008/0100020 A1 | 5/2008 | Gashi et al. | |
| 2008/0111334 A1 | 5/2008 | Inoue et al. | |
| 2008/0164111 A1 | 7/2008 | Inoue et al. | |
| 2008/0185807 A1 | 8/2008 | Takenaka | |
| 2008/0283315 A1 | 11/2008 | Suzuki et al. | |
| 2009/0033055 A1 | 2/2009 | Morris et al. | |
| 2009/0064808 A1 | 3/2009 | Parison et al. | |
| 2009/0071743 A1 * | 3/2009 | Gashi | B60G 3/01 |
| | | | 180/444 |
| 2009/0095584 A1 | 4/2009 | Kondo et al. | |
| 2009/0120745 A1 | 5/2009 | Kondo et al. | |
| 2009/0121398 A1 | 5/2009 | Inoue | |
| 2009/0173585 A1 | 7/2009 | Kappagantu | |
| 2009/0174158 A1 | 7/2009 | Anderson et al. | |
| 2009/0198419 A1 | 8/2009 | Clark | |
| 2009/0218867 A1 | 9/2009 | Clark | |
| 2009/0243402 A1 | 10/2009 | O'Day et al. | |
| 2009/0243598 A1 | 10/2009 | O'Day | |
| 2009/0273147 A1 | 11/2009 | Inoue et al. | |
| 2009/0286910 A1 | 11/2009 | Bloomfield | |
| 2009/0302559 A1 | 12/2009 | Doerfel | |
| 2009/0321201 A1 | 12/2009 | Sakuta et al. | |
| 2010/0044977 A1 | 2/2010 | Hughes et al. | |
| 2010/0059959 A1 | 3/2010 | Kim | |
| 2010/0116572 A1 * | 5/2010 | Schmitt | B62D 9/002 |
| | | | 701/22 |
| 2010/0200343 A1 | 8/2010 | Kondo et al. | |
| 2010/0207344 A1 | 8/2010 | Nakamura | |
| 2010/0222960 A1 | 9/2010 | Oida et al. | |
| 2010/0230876 A1 | 9/2010 | Inoue et al. | |
| 2010/0252376 A1 | 10/2010 | Chern et al. | |
| 2010/0253019 A1 | 10/2010 | Ogawa | |
| 2011/0115183 A1 | 5/2011 | Alesso et al. | |
| 2011/0209938 A1 * | 9/2011 | Basadzishvili | B60K 7/0007 |
| | | | 180/305 |
| 2011/0226570 A1 | 9/2011 | Ludwig | |
| 2011/0250477 A1 | 10/2011 | Yoshida et al. | |
| 2011/0277241 A1 | 11/2011 | Schejbal | |
| 2012/0013277 A1 | 1/2012 | Ogawa | |
| 2012/0059547 A1 | 3/2012 | Chen et al. | |
| 2012/0109483 A1 | 5/2012 | O'Dea et al. | |
| 2012/0153718 A1 | 6/2012 | Rawlinson et al. | |
| 2012/0181757 A1 | 7/2012 | Oteman et al. | |
| 2012/0187640 A1 | 7/2012 | Kondo et al. | |
| 2012/0193847 A1 | 8/2012 | Muragishi et al. | |
| 2012/0305348 A1 | 12/2012 | Katayama et al. | |
| 2012/0306170 A1 | 12/2012 | Serbu et al. | |
| 2013/0032442 A1 | 2/2013 | Tuluie | |
| 2013/0037362 A1 | 2/2013 | Gartner et al. | |
| 2013/0060422 A1 | 3/2013 | Ogawa et al. | |
| 2013/0060423 A1 | 3/2013 | Jolly | |
| 2013/0087420 A1 * | 4/2013 | Fraley | F16D 65/127 |
| | | | 188/218 XL |
| 2013/0106074 A1 | 5/2013 | Koku et al. | |
| 2013/0112514 A1 * | 5/2013 | Hanna | F16D 65/0006 |
| | | | 188/218 XL |
| 2013/0221625 A1 | 8/2013 | Pare et al. | |
| 2013/0229074 A1 | 9/2013 | Haferman et al. | |
| 2013/0233632 A1 | 9/2013 | Kim et al. | |

(56) References Cited

U.S. PATENT DOCUMENTS

| | | |
|---|---|---|
| 2013/0253764 A1 | 9/2013 | Kikuchi et al. |
| 2013/0277155 A1* | 10/2013 | Huang .............. F16D 65/127 164/75 |
| 2013/0341143 A1 | 12/2013 | Brown |
| 2014/0001687 A1 | 1/2014 | Braman et al. |
| 2014/0005888 A1 | 1/2014 | Bose et al. |
| 2014/0145498 A1 | 5/2014 | Yamakado et al. |
| 2014/0156143 A1 | 6/2014 | Evangelou et al. |
| 2014/0260233 A1 | 9/2014 | Giovanardi et al. |
| 2014/0312580 A1 | 10/2014 | Gale |
| 2014/0358378 A1 | 12/2014 | Howard et al. |
| 2015/0047933 A1 | 2/2015 | Keil et al. |
| 2015/0123370 A1 | 5/2015 | Lee et al. |
| 2015/0197130 A1 | 7/2015 | Smith et al. |
| 2015/0224845 A1 | 8/2015 | Anderson et al. |
| 2015/0231939 A1 | 8/2015 | Yamamotoya et al. |
| 2015/0231942 A1 | 8/2015 | Trangbaek et al. |
| 2015/0343876 A1 | 12/2015 | Yoshizawa et al. |
| 2015/0354647 A1* | 12/2015 | Tironi .............. C23C 4/10 427/451 |
| 2016/0059658 A1 | 3/2016 | Kuriki |
| 2016/0096458 A1 | 4/2016 | Parker et al. |
| 2016/0159187 A1 | 6/2016 | Mohamed |
| 2016/0167743 A1 | 6/2016 | Melcher |
| 2016/0200164 A1 | 7/2016 | Tabata et al. |
| 2016/0291574 A1 | 10/2016 | Parison |
| 2016/0339823 A1 | 11/2016 | Smith et al. |
| 2016/0347143 A1 | 12/2016 | Hrovat et al. |
| 2017/0047823 A1 | 2/2017 | Sangermano, III et al. |
| 2017/0100980 A1 | 4/2017 | Tsuda |
| 2017/0129367 A1 | 5/2017 | Hein |
| 2017/0129371 A1 | 5/2017 | Knox |
| 2017/0129372 A1 | 5/2017 | Hein et al. |
| 2017/0129373 A1 | 5/2017 | Knox et al. |
| 2017/0137023 A1 | 5/2017 | Anderson et al. |
| 2017/0144501 A1 | 5/2017 | Wall |
| 2017/0203673 A1 | 7/2017 | Parker et al. |
| 2017/0240018 A1 | 8/2017 | Mettrick et al. |
| 2017/0241504 A1 | 8/2017 | Delorenzis et al. |
| 2017/0253101 A1 | 9/2017 | Kuriki |
| 2017/0253155 A1 | 9/2017 | Knox et al. |
| 2018/0015801 A1 | 1/2018 | Mohamed et al. |
| 2018/0022178 A1 | 1/2018 | Xi |
| 2018/0029585 A1 | 2/2018 | Tanimoto |
| 2018/0056748 A1 | 3/2018 | Grimes |
| 2018/0056767 A1 | 3/2018 | Dolgov et al. |
| 2018/0065438 A1 | 3/2018 | Ogawa et al. |
| 2018/0079272 A1 | 3/2018 | Aikin |
| 2018/0089901 A1 | 3/2018 | Rober et al. |
| 2018/0105082 A1 | 4/2018 | Knox |
| 2018/0126816 A1 | 5/2018 | Kondo et al. |
| 2018/0134111 A1 | 5/2018 | Toyohira et al. |
| 2018/0162186 A1 | 6/2018 | Anderson et al. |
| 2018/0162187 A1 | 6/2018 | Trangbaek |
| 2018/0195570 A1 | 7/2018 | Churchill et al. |
| 2018/0208009 A1 | 7/2018 | McGuire et al. |
| 2018/0222274 A1 | 8/2018 | Davis et al. |
| 2018/0297587 A1 | 10/2018 | Kasaiezadeh Mahabadi et al. |
| 2018/0345747 A1 | 12/2018 | Boon et al. |
| 2018/0370314 A1 | 12/2018 | Higle |
| 2019/0011004 A1 | 1/2019 | Mettrick et al. |
| 2019/0023094 A1 | 1/2019 | Panagis et al. |
| 2019/0118604 A1 | 4/2019 | Suplin et al. |
| 2019/0248203 A1 | 8/2019 | Krehmer et al. |
| 2019/0308484 A1 | 10/2019 | Belter et al. |
| 2020/0088214 A1 | 3/2020 | Woodard et al. |
| 2020/0171907 A1 | 6/2020 | Hall et al. |
| 2020/0180386 A1 | 6/2020 | Tabata et al. |
| 2020/0216128 A1 | 7/2020 | Doerksen |
| 2021/0061046 A1 | 3/2021 | Simon et al. |
| 2021/0070129 A1 | 3/2021 | Keil |
| 2021/0199169 A1 | 7/2021 | Morton et al. |
| 2021/0252935 A1 | 8/2021 | Belter et al. |
| 2022/0250432 A1 | 8/2022 | Hawkins |
| 2022/0388364 A1 | 12/2022 | Fowle et al. |

FOREIGN PATENT DOCUMENTS

| | | |
|---|---|---|
| CN | 111139730 B | 6/2021 |
| CN | 109955704 B | 8/2021 |
| CN | 115560031 A | 1/2023 |
| CN | 115637638 A | 1/2023 |
| DE | 4037223 A1 | 10/1991 |
| DE | 19853876 A1 | 5/2000 |
| DE | 19850169 C1 | 7/2000 |
| DE | 102009060213 A1 | 6/2011 |
| DE | 102010030700 A1 | 1/2012 |
| DE | 102010041404 A1 | 3/2012 |
| DE | 202012002846 U1 | 7/2012 |
| DE | 102012004682 A1 | 9/2013 |
| DE | 102015003530 A1 | 9/2016 |
| DE | 102016000686 A1 | 7/2017 |
| DE | 102016112240 A1 | 1/2018 |
| DE | 102018208774 A1 | 12/2019 |
| EP | 0344923 A1 | 12/1989 |
| EP | 1693233 B1 | 4/2009 |
| EP | 2072855 A1 | 6/2009 |
| EP | 2233330 B1 | 2/2013 |
| EP | 3088230 A1 | 11/2016 |
| EP | 2976544 B1 | 11/2018 |
| GB | 2220625 A | 1/1990 |
| GB | 2437633 A | 10/2007 |
| GB | 2539866 A | 1/2017 |
| JP | S61155211 U | 9/1986 |
| JP | H06183365 A | 7/1994 |
| JP | 2004155258 A | 6/2004 |
| JP | 2005289321 A | 10/2005 |
| JP | 2006200734 A | 8/2006 |
| JP | 2012002300 A | 1/2012 |
| JP | 2012167757 A | 9/2012 |
| JP | 2013244841 A | 12/2013 |
| JP | 5796315 B2 | 10/2015 |
| KR | 20060064917 A | 6/2006 |
| KR | 101509600 B1 | 4/2015 |
| KR | 20170095073 A | 8/2017 |
| WO | 9304883 A1 | 3/1993 |
| WO | 2011148792 A1 | 12/2011 |
| WO | 2012028228 A2 | 3/2012 |
| WO | 2014004118 A1 | 1/2014 |
| WO | 2014004119 A1 | 1/2014 |
| WO | 2014094934 A1 | 6/2014 |
| WO | 2015153811 A1 | 10/2015 |
| WO | 2015169530 A1 | 11/2015 |
| WO | 2016120044 A1 | 8/2016 |
| WO | 2017055151 A1 | 4/2017 |

OTHER PUBLICATIONS

Tenneco, "Integrated Kinetic, H2 CES System, Ride Control Innovation, Accelerated", Rev. Sep. 2011, 4 pp.
porsche.com, "Porsche AG: Porsche 918 RSR—Racing Laboratory With Even Higher-Performance Hybrid Drive—Porsche USA", Current Press Releases dated Jan. 10, 2011, Downloaded Mar. 13, 2017, www.porsche.com/usa/aboutporsche/pressreleases/pag/?pool=international-de&id-2011-01-10, 6 pp.
autoblog.com, "Porsche (finally) Unleashes Full, Official Details in 918 Spyder—Autoblog", Sep. 9, 2013, www.autoblog.com/2013/09/09/porsche-official details-918-spyder-frankfurt/, Downloaded Mar. 13, 2017, 26 pp.
press.porsche.com, "Introducing the Porsche 918 Spyder", Date Unknown, http://press.porsche.com/news/release.php?id-787, Downloaded Mar. 13, 2017, 7 pp.
Bolognesi, P., et al., "FEM Modeling and Analysis of a Novel Rotary-Linear Isotropic Brushless Machine", XIX International Conference of Electrical Machines—ICEM 2010, Rome (6 pp).
Ku, Lei, et al., "Design and Analysis of a Double-Stator Linear-Rotary Permanent-Magnet Motor", IEEE Transactions on Applied Superconductivity, vol. 26, No. 4, Jun. 2016, (4 pp).
SAE International, "Michelin re-invents the wheel", Oct. 14, 2008, Downloaded Sep. 7, 2017, http://articles.sae.org/4604/ (2 pp).
Edren, Johannes, "Motion Modelling and Control Strategies of Over-Actuated Vehicles", Doctoral Thesis, Stockholm 2014 (56 pp).

(56) References Cited

OTHER PUBLICATIONS

Daimler.com, "Suspension: The world's first suspension system with 'eyes'", https://media.daimler.com/marsMediaSite/en/instance/ko/Suspension-The-worlds-first-suspension-system-with-eyes.xhtml?oid=9904306, May 15, 2013 (6 pp).

youtube.com., KSSofficial, "Miniature Ball Screw With Ball Spline / English", Published on May 10, 2013, https://www.youtube.com/watch?v=vkcxmM0iC8U (2 pp).

Nippon Bearing, "Ball Screw Spline SPBR/SPBF", Product Description, Date Unknown, Downloaded Jun. 28, 2019, https://www.nbcorporation.com/shop/ball-spline/spbr-spbf/ (2 pp).

Wikipedia, "Trailing-arm suspension", https://en.wikipedia.org/wiki/Trailing-arm_suspension, downloaded Sep. 3, 2019 (2 pp).

Cosford, J., "Is it a fair fight? Hydraulics vs. electrics", https://www.mobilehydraulictips.com/fair-fight-hydraulics-vs-electrics/, Mar. 28, 2014 (10 pp).

International Search Report and Written Opinion in Intl App No. PCT/US2022/027040 mailed Jul. 5, 2022 (15 pp).

Collins, S., "J Dampers In Formula One—Racecar Engineering", Downloaded Apr. 18, 2023, https://www.racecar-engineering.com/articles/f1/understanding-the-j-damper/ (4 pp).

\* cited by examiner

VIBRATION CONTROL SYSTEM

CROSS-REFERENCE TO RELATED APPLICATIONS

This application is a continuation of United States Patent Application No. 17/308,131, filed on May 5, 2021, which claims the benefit of U.S. Provisional Application No. 63/048,795, filed on Jul. 7, 2020, the contents of which are hereby incorporated by reference in their entirety for all purposes.

TECHNICAL FIELD

This disclosure relates to vibration control systems.

BACKGROUND

A vibration control system can be used to reduce unwanted vibration effects. The unwanted vibration effects are applied to a primary mass. A secondary mass, which is referred to herein as a damper mass, is smaller than the first mass and is connected to the primary mass by a damper assembly having characteristics that are selected (e.g., tuned) so that movement of the damper mass will result in vibrations that reduce the unwanted vibration effects. The damper assembly may be configured so that movement of the damper mass is out of phase with and/or opposite in direction relative to the unwanted vibration effects in order to reduce them.

SUMMARY

A first aspect of the disclosure is an apparatus that includes a knuckle, a wheel that is connected to the knuckle so that it is able to rotate with respect to the knuckle on a rotation axis, a brake rotor that is connected to the wheel for rotation with the wheel, and a caliper assembly that is connected to the knuckle so that the caliper assembly is able to move according to a line of action. The apparatus also includes a damper assembly that is connected to the knuckle and is connected to the caliper assembly to regulate movement of the caliper assembly with respect to the knuckle along the line of action, wherein the caliper assembly and the damper assembly cooperate to define a mass damper system that damps vibration of the wheel.

In some implementations of the apparatus according to the first aspect of the disclosure, the damper assembly includes a damper and a spring. In some implementations of the apparatus according to the first aspect of the disclosure, the spring biases the caliper assembly toward a neutral position and the damper resists movement of the caliper assembly with respect to the knuckle. In some implementations of the apparatus according to the first aspect of the disclosure, the caliper assembly is connected to the knuckle by a linear bearing that restrains movement of the caliper assembly according to the line of action.

In some implementations of the apparatus according to the first aspect of the disclosure, the line of action extends radially with respect to the rotation axis. In some implementations of the apparatus according to the first aspect of the disclosure, the line of action is generally vertical.

In some implementations of the apparatus according to the first aspect of the disclosure, the caliper assembly includes an outer caliper plate, an inner caliper plate, and an actuator that is configured to move the inner caliper plate and the outer caliper plate into engagement with a first rotor surface and a second rotor surface of the brake rotor, and the first rotor surface and the second rotor surface of the brake rotor are formed from a brake friction material.

A second aspect of the disclosure is an apparatus that includes a knuckle, a wheel that is connected to the knuckle so that it is able to rotate with respect to the knuckle on a rotation axis, a brake rotor that is connected to the wheel for rotation with the wheel, and a caliper assembly that is connected to the knuckle so that the caliper assembly is able to translate with respect to the knuckle, the wheel, and the brake rotor. The caliper assembly includes a first caliper part that is located on an inboard side of the brake rotor, a second caliper part that is located on an outboard side of the brake rotor, and an actuator that is configured to move the caliper assembly into engagement with the brake rotor. The apparatus also includes a mass damper system having a damper mass and a damper assembly, wherein the caliper assembly is part of the damper mass, the damper assembly is connected to the knuckle, the damper assembly is connected to the damper mass, and the damper assembly is configured to regulate movement of the damper mass with respect to the knuckle to damp vibration of the wheel.

In some implementations of the apparatus according to the second aspect of the disclosure, the first caliper part and the second caliper part are each a ring-like structure that extends around a central opening. In some implementations of the apparatus according to the second aspect of the disclosure, the first caliper part includes a first caliper surface that is engageable with the brake rotor, the second caliper part includes a second caliper surface that is engageable with the brake rotor, and the first caliper surface and the second caliper surface are formed from a ferrous material.

In some implementations of the apparatus according to the second aspect of the disclosure, the brake rotor includes a support disk, the brake rotor includes a first rotor surface that is formed from a brake friction material, the brake rotor includes a second rotor surface that is formed from the brake friction material, the first rotor surface is located on a first side of the support disk, and the second rotor surface is located on a second side of the support disk. In some implementations of the apparatus according to the second aspect of the disclosure, the brake friction material includes an organic material and a binder.

In some implementations of the apparatus according to the second aspect of the disclosure, a mass of the caliper assembly is greater than a mass of the brake rotor. In some implementations of the apparatus according to the second aspect of the disclosure, a thermal mass of the caliper assembly is greater than a thermal mass of the brake rotor.

In some implementations of the apparatus according to the second aspect of the disclosure, the damper assembly includes a damper and a spring, the spring biases the damper mass toward a neutral position, and the damper resists movement of the damper mass with respect to the knuckle. In some implementations of the apparatus according to the second aspect of the disclosure, the damper mass is connected to the knuckle by a linear bearing that restrains the damper mass to linear movement with respect to the knuckle.

A third aspect of the disclosure is an apparatus that includes a support structure and a wheel that is rotatable with respect to the support structure. A brake rotor is connected to the wheel for rotation with the wheel. The brake rotor has a first rotor surface that is formed from a brake friction material and a second rotor surface that is formed from the brake friction material. The apparatus also includes an inner caliper plate that has a first caliper surface, wherein the inner caliper plate is located on a first side of the brake rotor. The apparatus also includes an outer caliper plate that has a second caliper surface, wherein the outer caliper plate is located on a second side of the brake rotor. The apparatus also includes an actuator that is configured to move the inner caliper plate and the outer caliper plate into engagement with the brake rotor. The mass damper system has a damper mass and a damper assembly. The inner caliper plate and the outer caliper plate are part of the damper mass. The damper assembly is connected to the support structure and the damper assembly is connected to the damper mass. The damper assembly is configured to regulate movement of the damper mass with respect to the support structure to damp vibration of the wheel.

In some implementations of the apparatus according to the third aspect of the disclosure, the damper assembly includes a damper and a spring. In some implementations of the apparatus according to the third aspect of the disclosure, the spring biases the damper mass toward a neutral position, and the damper resists movement of the damper mass with respect to the support structure. In some implementations of the apparatus according to the third aspect of the disclosure, the damper mass is connected to the support structure by a linear bearing that restrains the damper mass to linear movement with respect to the support structure.

In some implementations of the apparatus according to the third aspect of the disclosure, the brake friction material includes an organic material and a binder. In some implementations of the apparatus according to the third aspect of the disclosure, the brake friction material is a non-asbestos organic brake friction material. In some implementations of the apparatus according to the third aspect of the disclosure, the brake friction material is a semi-metallic brake friction material. In some implementations of the apparatus according to the third aspect of the disclosure, the brake friction material is a ceramic brake friction material. In some implementations of the apparatus according to the third aspect of the disclosure, the brake friction material is a sintered metal brake friction material.

DETAILED DESCRIPTION

Figure 1:
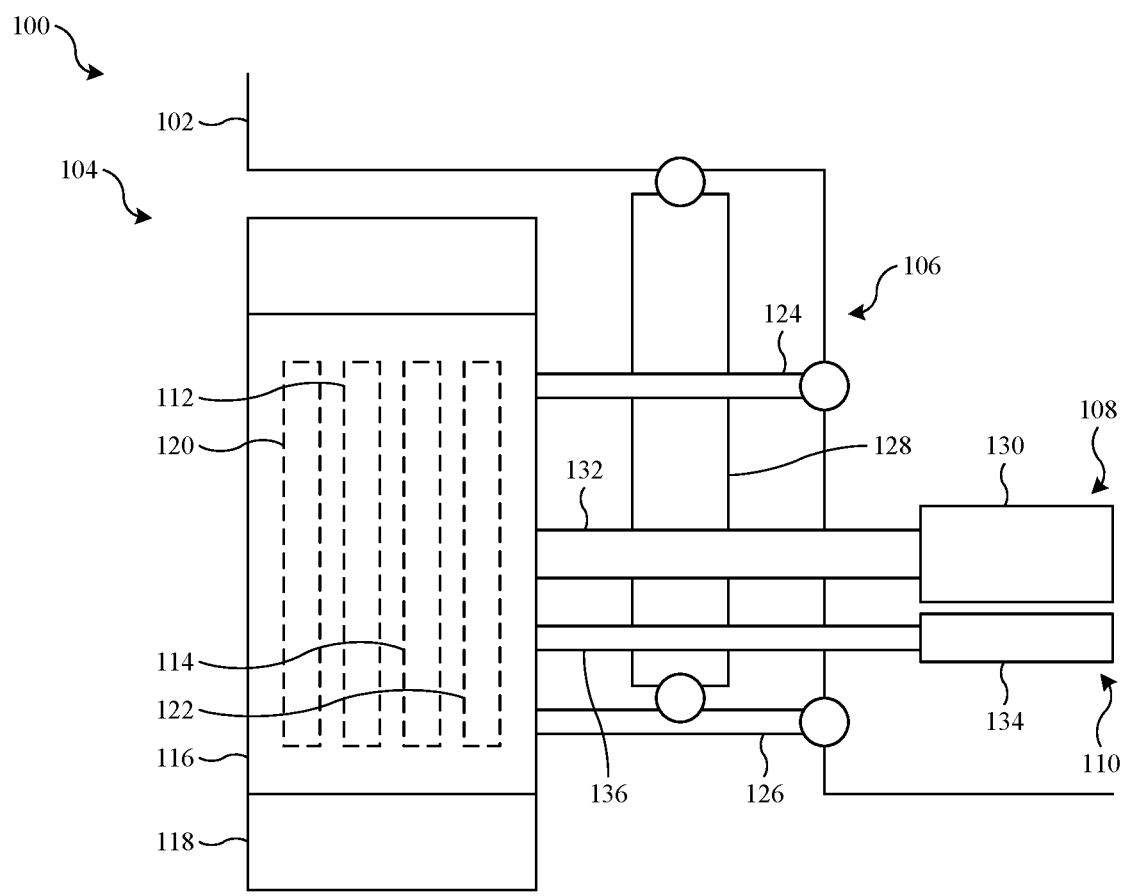
FIG. 1 is a block diagram that shows a portion of a vehicle.

In the suspension systems that are described herein, a mass damper system is connected to a wheel of a vehicle to reduce unwanted vibration effects that are experienced by the unsprung mass of the vehicle. The unwanted vibration effects may, for example, include or contribute to causing wheel hop. In the suspension systems that are described herein, the mass damper system uses some of the braking components of the vehicle as all of or part of the damper mass.

In a typical conventional disk brake system for an automobile, a rotor is connected to the wheel so that it rotates in unison with the wheel, and a caliper assembly is mounted (e.g., supported by a suspension knuckle) so that it does not rotate with the wheel. The rotor is a large, disk-like structure that is typically formed from a ferrous material that has a high thermal conductivity such as cast iron. The large mass and high thermal conductivity of the rotor allow it to serve as a heat sink. The caliper assembly includes a caliper housing, one or more actuators (e.g., hydraulic pistons), and brake pads that are moved into engagement with the rotor by the actuators to apply braking force. Brake pads have a low thermal conductivity as compared to the rotor, because of the materials typically chosen for the brake pads.

In typical conventional disk brake systems, the brake pads are formed from a brake friction material. The term "brake friction material" is recognized in the art as referring to a class of composite materials that are suitable for use in friction brake pads to generate braking forces by engagement with a brake rotor. Commonly used brake friction materials are composite materials that include non-asbestos organic materials in a binder, including non-metallic brake friction materials and semi-metallic brake friction materials. Other brake friction materials include sintered metal brake friction materials and ceramic brake friction materials. In typical implementations, the mass of the rotor is larger than the mass of the caliper assembly, and the thermal mass of the rotor is likewise larger than the thermal mass of the caliper assembly so that the rotor serves as the primary heat sink for absorbing heat created during braking in conventional disk brake systems.

In some of the suspension systems that are described herein, a brake system is configured so that the mass of the components that are used as part of the damper mass of the mass damper system is increased relative to conventional disk brake system designs. As an example, a rotor is mounted so that it rotates in unison with a wheel, as in a conventional disk brake system, but includes engaging surfaces formed from a brake friction material, has significantly less mass than a conventional disk brake rotor, and does not serve as the primary heat sink of the brake system. The caliper assembly includes inner and outer caliper plates, which may be ring-like structures (E.g., caliper rings). The engaging surfaces of the inner and outer caliper plates may be formed from a ferrous material. The ferrous material may be, for example, an iron-based metal or metal alloy. The engaging surfaces of the inner and outer caliper plates may alternatively be formed from other materials, such as a metal matrix composite. In this example, the caliper plates therefore have a much higher thermal conductivity than the brake friction material of the rotor. As a result, the caliper assembly has a significantly larger mass than a traditional disk brake caliper housing and brake pads, and the inner and outer caliper plates structures serve as the primary heat sink of the brake system.

FIG. 1 is a schematic illustration that shows a part of a vehicle 100. As an example, the vehicle 100 may be a conventional road-going vehicle that is supported by wheels and tires (e.g., four wheels and tires). As an example, the vehicle 100 may be a passenger vehicle that includes a passenger compartment that is configured to carry one or more passengers. As another example, the vehicle 100 may be a cargo vehicle that is configured to carry cargo items in a cargo compartment.

In the illustrated example, the vehicle 100 includes a vehicle body structure 102, a wheel assembly 104, a suspension system 106, a propulsion system 108, a steering system 110, a brake system 112, and a mass damper system 114.

The vehicle body structure 102 includes components that are part of the sprung mass of the vehicle 100. The vehicle body structure 102 may be a multi-part structure. The vehicle body structure 102 may include a frame, a subframe, a unibody, a body, a monocoque, and/or other types of vehicle frame and body structures. The vehicle body structure 102 may include or support components that define internal structural portions of the vehicle (e.g., frame rails, structural pillars, etc.), and external aesthetic portions of the vehicle (e.g., body panels). The vehicle body structure 102 may, for example, include or define a passenger compartment for carrying passengers. The vehicle body structure 102 may, for example, include or define a cargo compartment for carrying cargo.

The wheel assembly 104 includes a wheel 116, a tire 118, and a wheel hub 120. The wheel 116, the tire 118, and the wheel hub 120 are all conventional components. For example, the wheel 116 may be a steel wheel of conventional design that supports the tire 118, which may be a pneumatic tire. The wheel hub 120 serves as an interface between non-rotating components of the suspension system 106 of the vehicle 100, and rotating components, including the wheel 116 and the tire 118. As an example, the wheel hub 120 may include a bearing that allows rotation relative to components of the suspension system 106.

The suspension system 106 may include a knuckle 122, an upper control arm 124, a lower control arm 126, and a suspension damper 128. The knuckle 122 is located partly inside an internal space of the wheel 116 and serves as a support structure for components of the wheel assembly 104 and the brake system 112. The knuckle 122 is connected to the wheel hub 120 to support the wheel 116 and the tire 118 for rotation with respect to the knuckle. The knuckle 122 is also connected to non-rotating components of the brake system 112, while rotating components of the brake system 112 are connected to the wheel hub 120 and/or the wheel 116.

The upper control arm 124 and the lower control arm 126 connect the knuckle 122 to the vehicle body structure 102 such that the knuckle 122 is movable with respect to the vehicle body structure 102, primarily in a generally vertical direction. As an example, the upper control arm 124 and the lower control arm 126 may each be connected to the vehicle body structure 102 and to the knuckle 122 by pivot joints that allow rotation in one or more rotational degrees of freedom. The suspension damper 128 is a suspension component that is configured to regulate motion of the wheel assembly 104 with respect to the vehicle body structure 102. The suspension damper 128 may be, as examples, a shock, a strut, a spring, a linear actuator, or other active suspension component or passive suspension component.

The propulsion system 108 includes propulsion components that are configured to cause motion of the vehicle 100 (e.g., accelerating the vehicle 100), by generating and transmitting torque to the wheel assembly 104 (and other wheels of the vehicle 100). In the illustrated example, the propulsion system 108 includes a motor 130 and a drive shaft 132 that connects the motor 130 to the wheel assembly 104. The motor 130 may be, as examples, an internal combustion engine powered by a combustible fuel or one or more electric motors that are powered by electricity (e.g., from a battery). Electric motors that are included in the propulsion system 108 may further be configured to operate as generators that charge the battery in a regenerative braking configuration.

The steering system 110 is operable to cause the vehicle to turn by changing a steering angle of the wheel assembly 104 (and other wheels of the vehicle 100). In the illustrated implementation, the steering system 110 includes a steering actuator 134 and a steering linkage 136 that is connected to the knuckle 122.

The brake system 112 provides deceleration torque for decelerating the vehicle 100 using friction braking components, as will be described further herein.

The mass damper system 114 is a passive suspension component that is a part of the suspension system 106 and is configured to damp vibration of the wheel assembly 104. The mass damper system 114 damps vibration of the wheel assembly 104 by regulating movement of a damper mass. As will be explained herein, the damper mass includes components from the brake system 112. By damping vibration of the wheel assembly 104, the mass damper system 114 is able to reduce transmission of vibration from the unsprung mass of the vehicle 100 to the sprung mass of the vehicle 100, and is also able to reduce the occurrence of wheel hop. By incorporating parts of the brake system 112 in the damper mass, the mass damper system 114 reduces the amount of added mass that is needed to damp vibrations of the wheel assembly 104.

Figure 2:
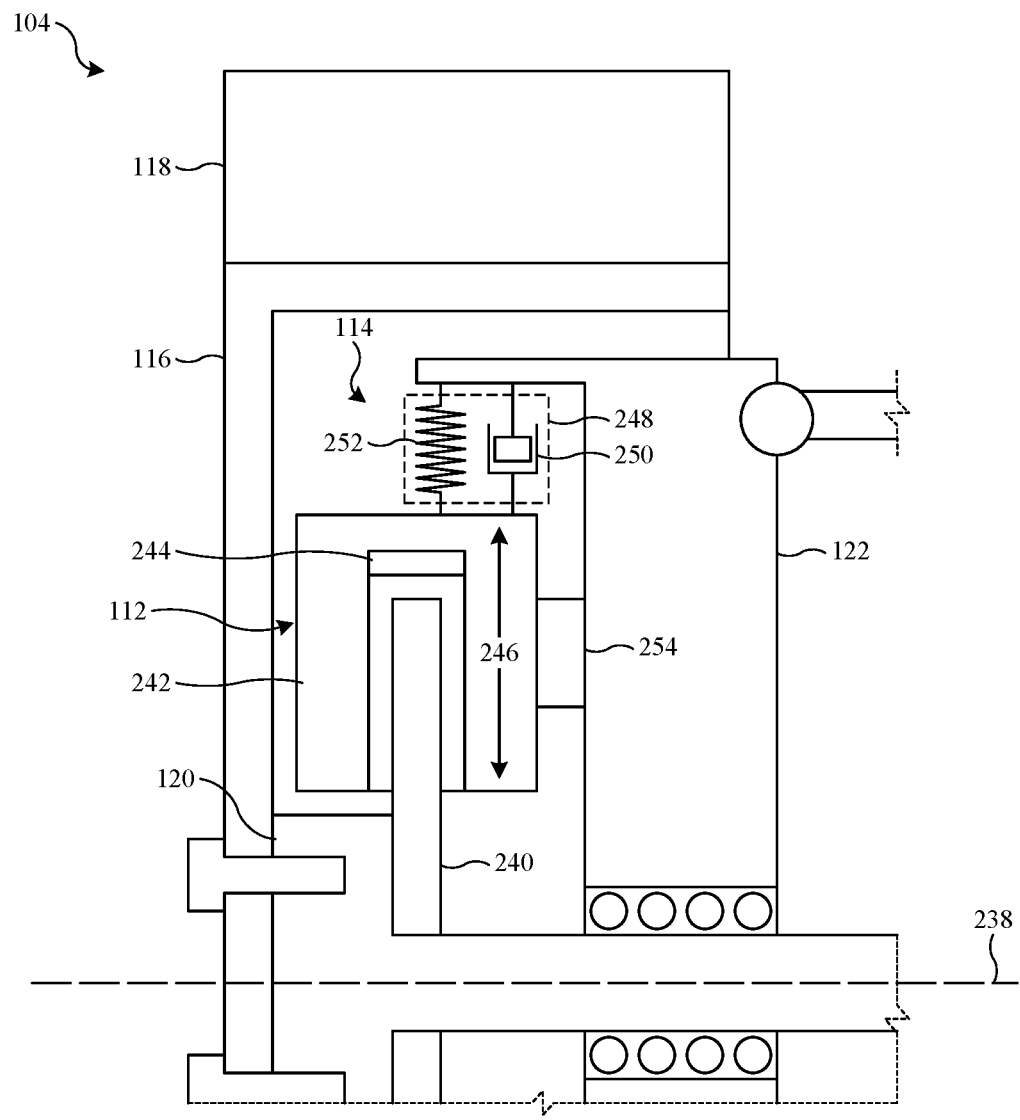
FIG. 2 is a schematic rear view cross-section illustration that shows a wheel assembly, a brake system, and a mass damper system.

FIG. 2 is a schematic rear view cross-section illustration that shows the wheel assembly 104, the brake system 112 and the mass damper system 114. The knuckle 122 serves as a support structure for the wheel assembly 104, the brake system 112, and the mass damper system. In the illustrated implementation, the wheel hub 120 is connected to the knuckle 122. The wheel hub 120 is a connecting structure that supports the wheel assembly 104 so that the wheel assembly 104 is able to rotate with respect to the knuckle 122 or other support structure of the suspension system 106 that connects the wheel assembly 104 to the sprung mass of the vehicle 100. In the illustrated implementation, the wheel 116 and the tire 118 are connected to the knuckle 122 by the wheel hub 120 so that the wheel 116 and the tire 118 are able to rotate with respect to the knuckle 122 on a rotation axis 238. At least part of the wheel hub 120 may extend along the rotation axis 238 and include or define a rotational joint (e.g., including bearings) that allows rotation with respect to the 122.

The brake system 112 includes a brake rotor 240, a caliper assembly 242, and an actuator 244. The brake rotor 240 is connected to the wheel 116 for rotation with the wheel 116 (e.g., the brake rotor 240 rotates in unison with the wheel 116). The caliper assembly 242 is connected to the knuckle 122 so that the caliper assembly 242 is able to move according to (e.g., generally parallel to) a line of action 246. In some implementations, the line of action 246 extends radially with respect to the rotation axis 238. In some implementations, the line of action 246 is generally vertical (e.g., within fifteen degrees of vertical).

The mass damper system 114 includes a damper mass and a damper assembly 248. The damper mass is the part of the mass damper system 114 that moves in order to counteract unwanted vibrations of the wheel assembly 104. Portions of the brake system 112 are included in the damper mass. In the illustrated implementation, the caliper assembly 242 is part of the damper mass.

The damper assembly 248 is configured to regulate motion of the damper mass so that movement of the damper mass counters the unwanted vibrations of the wheel assembly 104. The damper assembly 248 is connected to a support structure, which is this implementation is the knuckle 122. The damper assembly is also connected to the damper mass, which in this implementation includes the caliper assembly 242 and may optionally include other structures.

Thus, in the illustrated implementation, the damper assembly 248 is connected to the knuckle 122 and is connected to the caliper assembly 242 to regulate movement of the caliper assembly 242 with respect to the knuckle 122 along the line of action line of action 246, wherein the caliper assembly 242 (being part of or all of the damper mass) and the damper assembly 248 cooperate to define the mass damper system 114, which damps vibration of the wheel 116 and other portions of the wheel assembly 104.

In the illustrated implementation, the damper assembly 248 includes a damper 250 and a spring 252. The spring 252 biases the caliper assembly 242 toward a neutral position. The neutral position is a position that the caliper assembly 242 is disposed in the absence of external forces that cause movement of the caliper assembly 242 with respect to the knuckle 122. The damper 250 resists movement of the caliper assembly 242 with respect to the knuckle 122. As an example, the damper assembly 248 may be configured so that the caliper assembly 242 is able to travel along the line of action 246 within a range of at least ten millimeters above the neutral position to at least ten millimeters below the neutral position.

The caliper assembly 242 and/or other portions of the damper mass may be connected a support structure (e.g., the knuckle 122) by structures other than the damper mass in order to regulate motion of the damper mass. As an example, the caliper assembly 242 may be connected to the knuckle 122 by a linear bearing 254. The linear bearing 254 is a mechanical component that may be implemented according to conventional designs, and functions to restrain motion other than linear translation. In the illustrated implementation, the caliper assembly 242 is connected to the knuckle 122 by the linear bearing 254 so that the linear bearing 254 restrains movement of the caliper assembly 242 according to the line of action 246, meaning that the linear bearing 254 resists movement other than movement along the line of action 246. It is noted that at least part of the caliper assembly 242 is fixed to the linear bearing 254, but portions of the caliper assembly 242 may move relative to each other in directions other than along the line of action 246.

Figure 3:
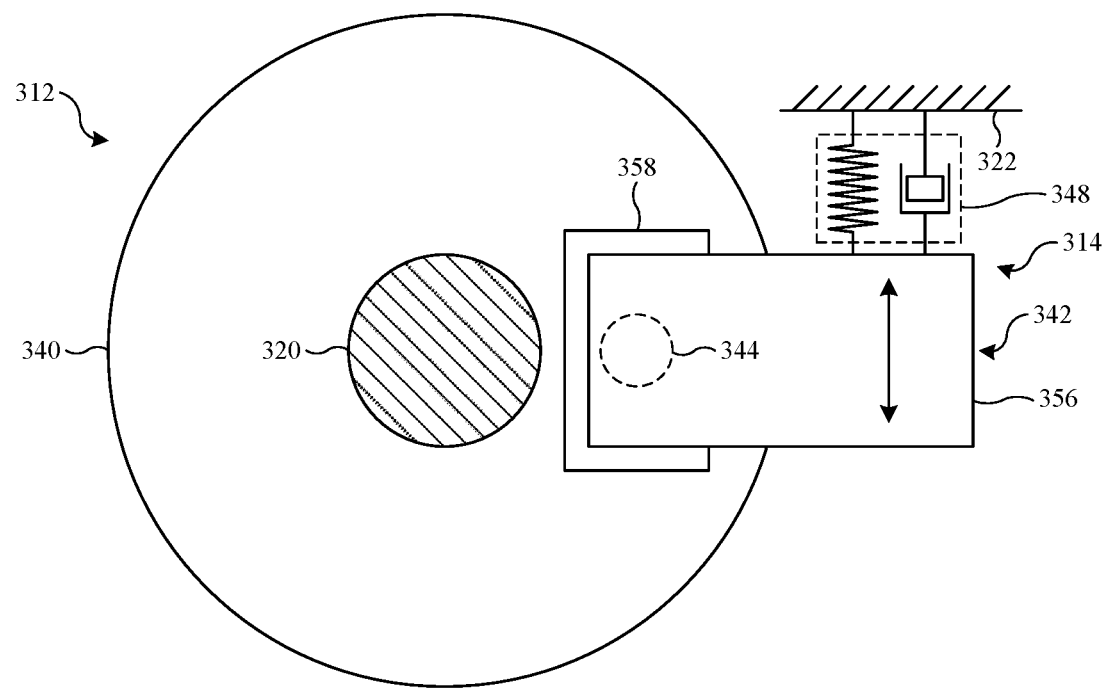
FIG. 3 is a schematic side view illustration that shows a brake system and a mass damper system according to a first example implementation.
Figure 4:
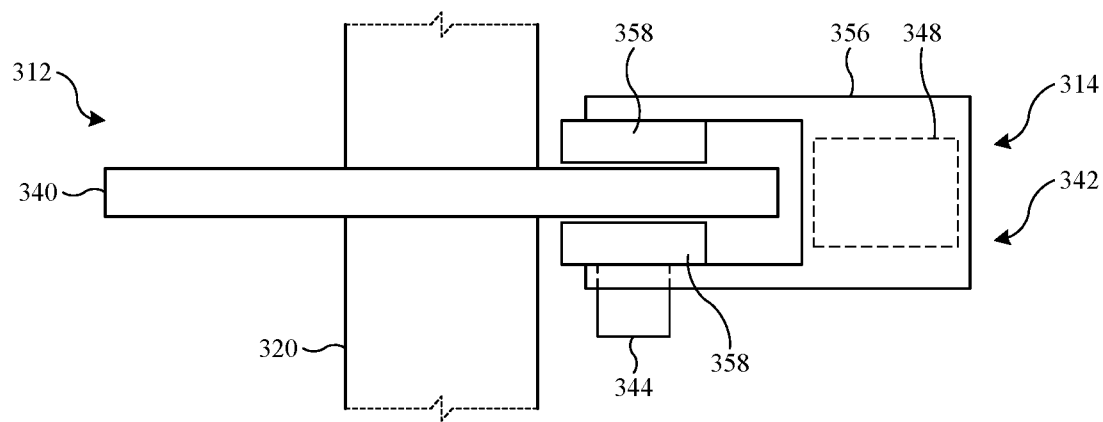
FIG. 4 is a schematic top view cross-section illustration that shows the brake system and the mass damper system according to the first example implementation.

FIG. 3 is a schematic side view illustration that shows a brake system 312 and a mass damper system 314 according to a first example implementation. FIG. 4 is a schematic top view cross-section illustration that shows the brake system 312 and the mass damper system 314 according to the first example implementation. The brake system 312 and the mass damper system 314 may be incorporated in the vehicle 100 in place of the brake system 112 and the mass damper system 114. The description of the brake system 112 and the mass damper system 114 is applicable to the brake system 312 and the mass damper system 314 except as described to the contrary herein.

The brake system 312 includes a brake rotor 340 and a caliper assembly 342. The brake rotor 340 is supported by a wheel hub 320 so that it rotates with a tire of the vehicle, as described with respect to the brake rotor 240, the wheel hub 120, and the tire 118 of the vehicle 100. The brake rotor 340 is formed from a material that has a high thermal conductivity and serves as the primary heat sink of the brake system 312. The caliper assembly 342 includes an actuator 344, a caliper housing 356, and brake pads 358. The caliper assembly 342 is supported by a support structure such as a knuckle 322 so that it does not rotate with the brake rotor 340. The caliper housing 356 is a structure that supports the actuator 344 and the brake pads 358. The actuator 344 (e.g., a hydraulic actuator or an electromechanical actuator) is operable to move the brake pads 358 into engagement with the brake rotor 340. The brake pads 358 include surfaces that are formed from a brake friction material and are engageable with the brake rotor 340 by contacting the brake rotor 340 when the brake pads 358 are moved into engagement with the brake rotor 340 by the actuator 344.

The mass damper system 314 includes a damper assembly 348 and a damper mass. The caliper assembly 342 is included in the damper mass. Other structures may be included in the damper mass. The damper assembly 348 regulates motion of the damper mass in order to damp vibrations of a wheel assembly, and may be configured in and operate in the manner described with respect to the damper assembly 248.

Figure 5:
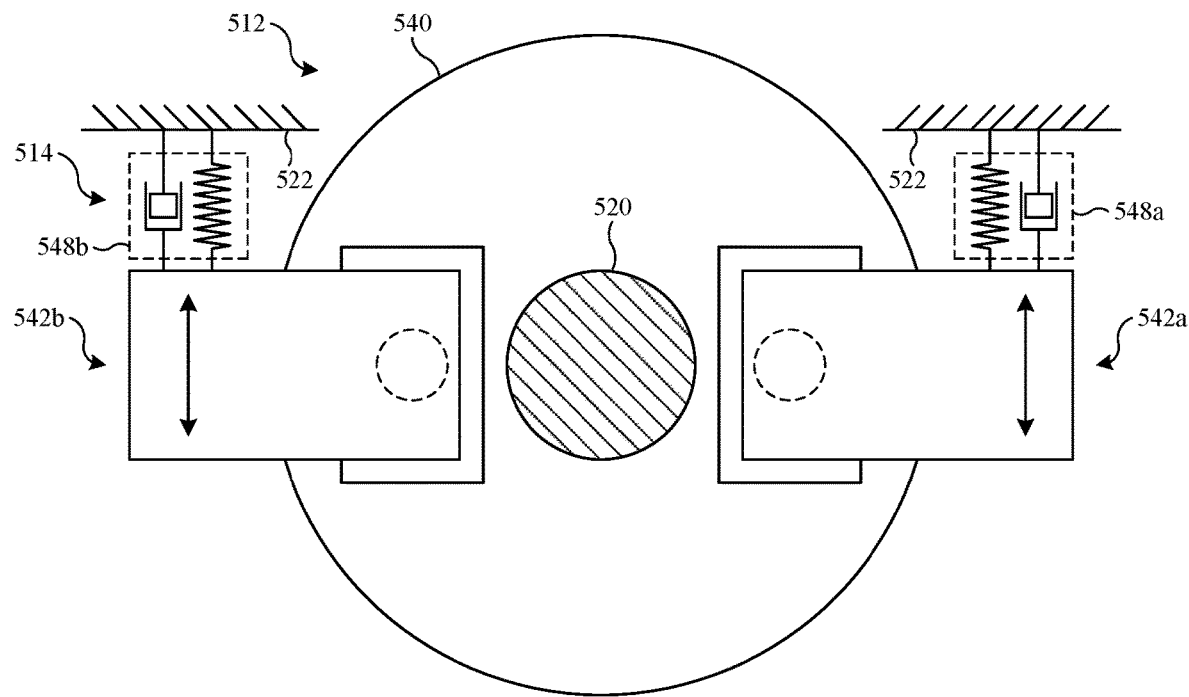
FIG. 5 is a schematic side view illustration that shows a brake system and a mass damper system according to a second example implementation.
Figure 6:
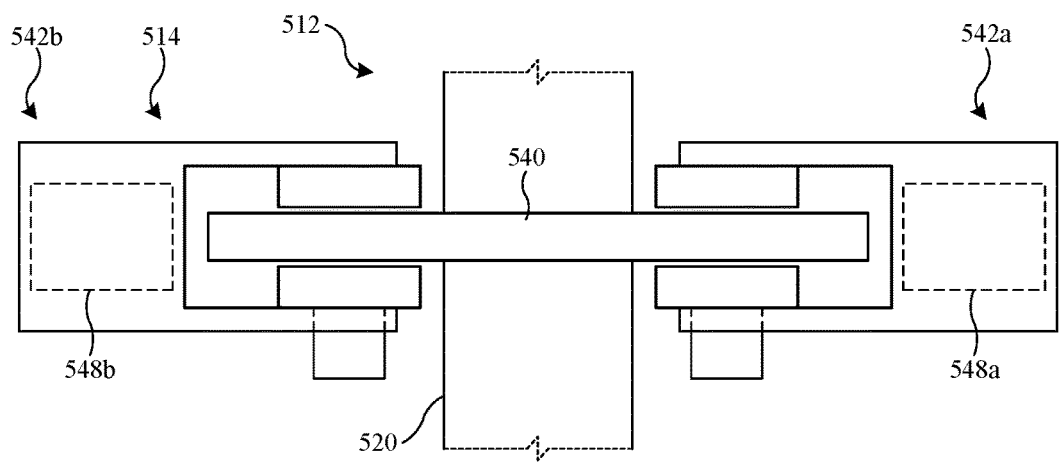
FIG. 6 is a schematic top view cross-section illustration that shows the brake system and the mass damper system according to the second example implementation.

FIG. 5 is a schematic side view illustration that shows the brake system 112 and the mass damper system 114 according to a second example implementation. FIG. 6 is a schematic top view illustration that shows the brake system 112 and the mass damper system 114 according to the second example implementation. The brake system 512 and the mass damper system 514 may be incorporated in the vehicle 100 in place of the brake system 112 and the mass damper system 114. The description of the brake system 112 and the mass damper system 114 is applicable to the brake system 512 and the mass damper system 514 except as described to the contrary herein.

The brake system 512 includes a brake rotor 540 that is supported by a wheel hub 520, a first caliper assembly 542*a* and a second caliper assembly 542*b*. The brake system 512 may be implemented in accordance with the description of the brake system 312 and may operate in the same manner. The first caliper assembly 542*a* and the second caliper assembly 542*b* may be implemented in the manner described with respect to the caliper assembly 342 and operate in the same manner. The first caliper assembly 542*a* and the second caliper assembly 542*b* are located at opposite sides of the brake rotor 540 (e.g., spaced by 180 degrees radially with respect to the brake rotor 540) and may be interconnected so that reaction forces during braking do not cause motion of the damper mass.

The mass damper system 314 includes a first damper assembly 548a that is connected to the first caliper assembly 542a, a second damper assembly 548b that is connected to the second caliper assembly 542b and a damper mass that includes the first caliper assembly 542a, the second caliper assembly 542b, and optionally includes other structures. The first damper assembly 548a and the second damper assembly 548b connect the first caliper assembly 542a and the second caliper assembly 542b to a support structure such as a knuckle 522. The first caliper assembly 542a and the second caliper assembly 542b may also be connected to the knuckle 522 by other structures such as linear bearings as previously described. The first damper assembly 548a and the second damper assembly 548b regulate motion of the damper mass to damp vibrations of the wheel assembly in the manner described with respect to the damper assembly 348 of the 314.

Figure 7:
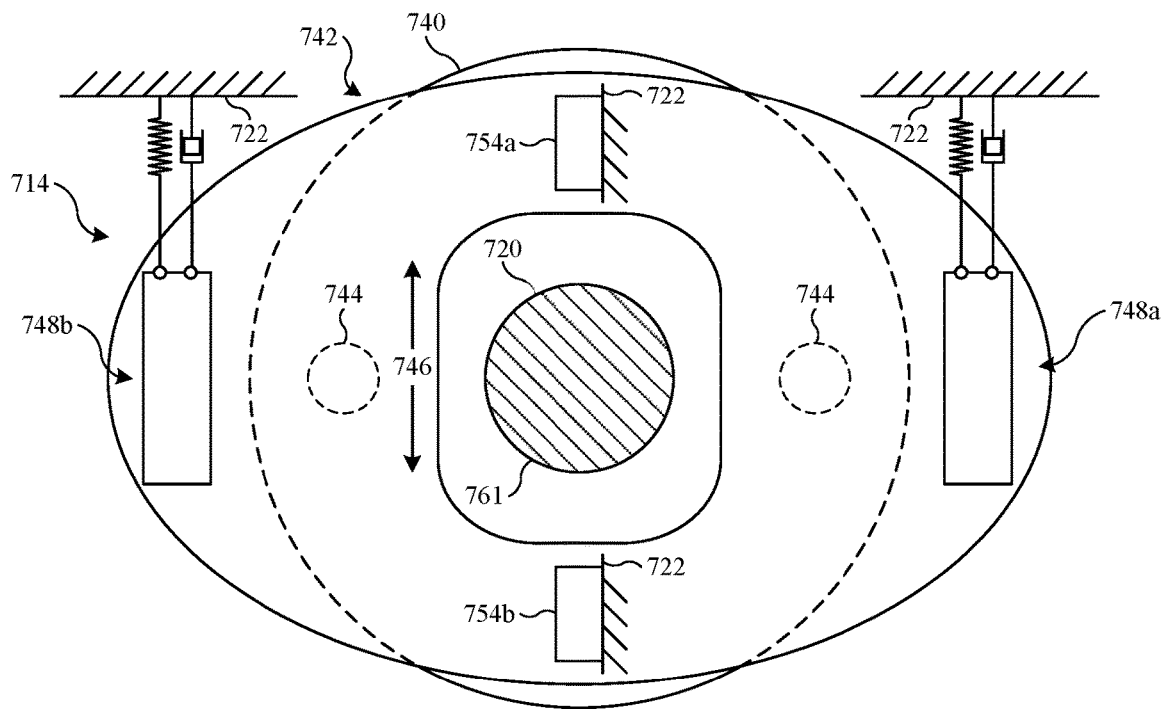
FIG. 7 is a schematic side view illustration that shows a brake system and a mass damper system according to a third example implementation.
Figure 8:
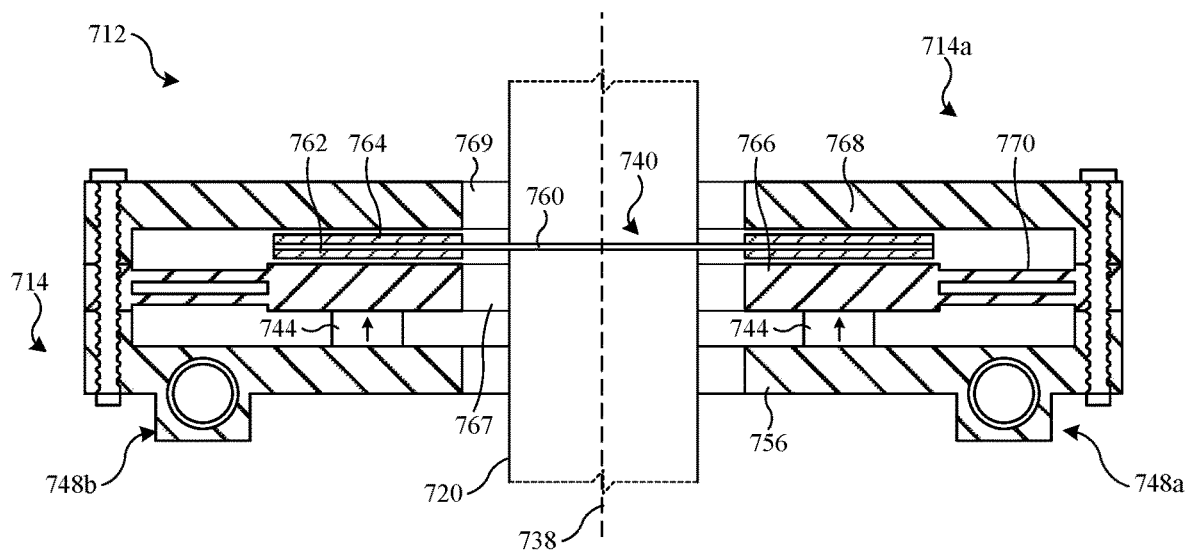
FIG. 8 is a schematic top view cross-section illustration that shows the brake system and the mass damper system according to the third example implementation.

FIG. 7 is a schematic side view illustration that shows a brake system 712 and a mass damper system 714 according to a third example implementation. FIG. 8 is a schematic top view cross-section illustration that shows the brake system 712 and the mass damper system 714 according to the third example implementation. The brake system 712 and the mass damper system 714 may be incorporated in the vehicle 100 in place of the brake system 112 and the mass damper system 114. The description of the brake system 112 and the mass damper system 114 is applicable to the brake system 712 and the mass damper system 714 except as described to the contrary herein.

The brake system 712 includes a brake rotor 740 and a caliper assembly 742. The brake rotor 740 is supported by a wheel hub 720 so that it rotates with a tire of the vehicle, as described with respect to the brake rotor 240, the wheel hub 120, and the tire 118 of the vehicle 100. The brake rotor 740 includes a support disk 760, a first friction pad portion 762, and a second friction pad portion 764.

The support disk 760 is an annular structure that is connected to the wheel hub 720 so that the support disk 760 rotates with the wheel of the vehicle and therefore rotates with respect to the caliper assembly 742, which does not rotate with the wheel of the vehicle. As an example, the support disk 760 may have a central opening 761 and a portion of the wheel hub 720 or a component associated with the wheel hub 720 may pass through the central opening 761 and engage the support disk 760 adjacent to the central opening 761. The support disk 760 and may be movable axially over a limited range with respect to the wheel hub 720 (e.g., by a splined connection of the support disk 760 to the wheel hub 720).

The support disk 760 functions to provide structural support for the first friction pad portion 762 and the second friction pad portion 764. The support disk 760 is formed from a substantially rigid material. As an example, the support disk 760 may be formed from metal.

The first friction pad portion 762 and the second friction pad portion 764 are each annular structures that are connected to and supported by the support disk 760. The first friction pad portion 762 includes a first brake rotor surface that engages the caliper assembly 742 during braking. The second friction pad portion 764 includes a second brake rotor surface that engages the caliper assembly 742 during braking.

The first friction pad portion 762 and the second friction pad portion 764 are each formed from a brake friction material. As an example, the brake friction material may include an organic material and a binder. As an example, the brake friction material may be a non-asbestos organic brake friction material. As an example, the brake friction material may be a semi-metallic brake friction material. As an example, the brake friction material may be a ceramic brake friction material. As an example, the brake friction material may be a sintered metal brake friction material.

The caliper assembly 742 includes actuators 744, a caliper frame 756, an inner caliper plate 766, and an outer caliper plate 768. The caliper assembly 742 is supported by a support structure such as a knuckle 722 so that it does not rotate with the brake rotor 740.

The caliper frame 756 is a structure that supports the actuators 744, the inner caliper plate 766, and the outer caliper plate 768. The caliper frame 756 is connected to the inner caliper plate 766, and to the outer caliper plate 768, such as by bolts located at an outer periphery of the caliper assembly 742 in the illustrated implementation.

In the illustrated implementation, the caliper frame 756 of the caliper assembly 742 is connected to the knuckle 722 by the mass damper system 714. The caliper frame 756 of the caliper assembly 742 is also connected to the knuckle 722 by a first linear bearing 754a and a second linear bearing 754b that allow motion of the caliper assembly 742 along a line of action 746, but restrain the caliper assembly 742 from moving with respect to the knuckle 722 other than according to the line of action 746. In some implementations, the line of action 746 extends radially with respect to a rotation axis 738 of the wheel hub 720. In some implementations, the line of action 746 is generally vertical (e.g., within fifteen degrees of vertical).

The inner caliper plate 766 is located on a first side of the brake rotor 740, which in this implementation is the inboard side of the brake rotor 740, which is located toward the body structure of the vehicle relative to the brake rotor 740. The inner caliper plate 766 is a disk-like structure, but need not have a circular outer periphery, as outer structures (e.g., oval) may be more suitable given that the inner caliper plate 766 (along with the remainder of the caliper assembly 742) translates up and down within the internal space of the wheel. The inner caliper plate 766 has a central opening 767, and the wheel hub 720 extends through the central opening 767. The central opening 767 provides clearance relative to the wheel hub 720 to allow translation of the inner caliper plate 766 with respect to the wheel hub 720. For example, the central opening 767 may be elongate in the direction of the line of action 746. The inner caliper plate 766, including the caliper surface thereof that is engageable with the brake rotor 740 during braking, extends around the central opening 767 in a ring-like configuration so that the caliper surface encircles the central opening 767.

The inner caliper plate 766 includes a flexible connector structure 770 by which the inner caliper plate 766 is connected to the caliper frame 756 and the outer caliper plate 768 at an outer periphery of the caliper assembly 742. The flexible connector structure 770 functions to allow axial travel of the inner caliper plate 766 when the actuators 744 engage the outer caliper plate 768 during braking. The configuration of the flexible connector structure 770 may be similar that of a clutch pressure plate.

The outer caliper plate 768 is located on a second side of the brake rotor 740, which in this implementation is the outboard side of the brake rotor 740, which is located away from the body structure of the vehicle relative to the brake rotor 740. The outer caliper plate 768 is a disk-like structure, but need not have a circular outer periphery, as outer structures (e.g., oval) may be more suitable given that the outer caliper plate 768 (along with the remainder of the caliper assembly 742) translates up and down within the internal space of the wheel. The outer caliper plate 768 has a central opening 769, and the wheel hub 720 extends through the central opening 769. The central opening 769 provides clearance relative to the wheel hub 720 to allow translation of the outer caliper plate 768 with respect to the wheel hub 720. For example, the central opening 769 may be elongate in the direction of the line of action 746. The outer caliper plate 768, including the caliper surface thereof that is engageable with the brake rotor 740 during braking, extends around the central opening 769 in a ring-like configuration so that the caliper surface encircles the central opening 769.

The configuration of and materials chosen for the inner caliper plate 766 and the inner caliper plate 766 are similar to the configuration and materials of conventional brake rotors. As a result, the caliper assembly 742 has a greater mass than the brake rotor 740 and the caliper assembly 742 has a greater thermal mass than the brake rotor 740. This concentrates the mass of the brake system 712 in the components that are used as the damper mass of the mass damper system 714. As an example, at least part of the inner caliper plate 766 and at least part of the outer caliper plate 768 may be formed from a ferrous material. The ferrous material of the inner caliper plate 766 and the outer caliper plate 768 may be, for example, an iron-based metal or an iron-based metal alloy, or a metal-matrix composite.

The material used for the inner caliper plate 766 and the outer caliper plate 768 has a much higher thermal conductivity than the thermal conductivity of the brake friction material of the brake rotor 740. The inner caliper plate 766 and the outer caliper plate 768 therefore have a much higher thermal capacity than the brake rotor 740, allowing the inner caliper plate 766 and the outer caliper plate 768 to serve as heat sinks and thereby reduce the heat absorbed by the brake rotor 740. As one example, the inner caliper plate 766 may include a first caliper surface that is engageable with the brake rotor 740, the outer caliper plate 768 may include a second caliper surface that is engageable with the brake rotor 740, and the first caliper surface and the second caliper surface may be formed from a ferrous material. As another example, the inner caliper plate 766 may include a first caliper surface that is engageable with the brake rotor 740, the outer caliper plate 768 may include a second caliper surface that is engageable with the brake rotor 740, and the first caliper surface and the second caliper surface may be formed from a metal-matrix composite. As another example, the inner caliper plate 766 may include a first caliper surface that is engageable with the brake rotor 740, the outer caliper plate 768 may include a second caliper surface that is engageable with the brake rotor 740, and the first caliper surface and the second caliper surface may be formed from a material having a higher thermal conductivity that the thermal conductivity of the brake rotor 740.

The actuators 744 (e.g., hydraulic actuators or electromechanical actuators) are operable to apply pressure to the inner caliper plate 766 which moves the inner caliper plate 766 into engagement with the brake rotor 740 and clamps the brake rotor 740 between the inner caliper plate 766 and the outer caliper plate 768 to apply braking.

The mass damper system 714 includes a first damper assembly 748a, a second damper assembly 748b and a damper mass. The caliper assembly 742 is included in the damper mass. Other structures may be included in the damper mass. The first damper assembly 748a and the second damper assembly 748b regulate motion of the damper mass in order to damp vibrations of a wheel assembly, and may be configured in and operate in the manner described with respect to the damper assembly 248. As an example, each of the first damper assembly 748a and the second damper assembly 748b may include a spring and a damper (e.g., a fluid damper), as previously described. In the illustrated example the first damper assembly 748a and the second damper assembly 748b are located on opposite sides of the wheel hub 720 in the front to rear direction of the vehicle.

Figure 9:
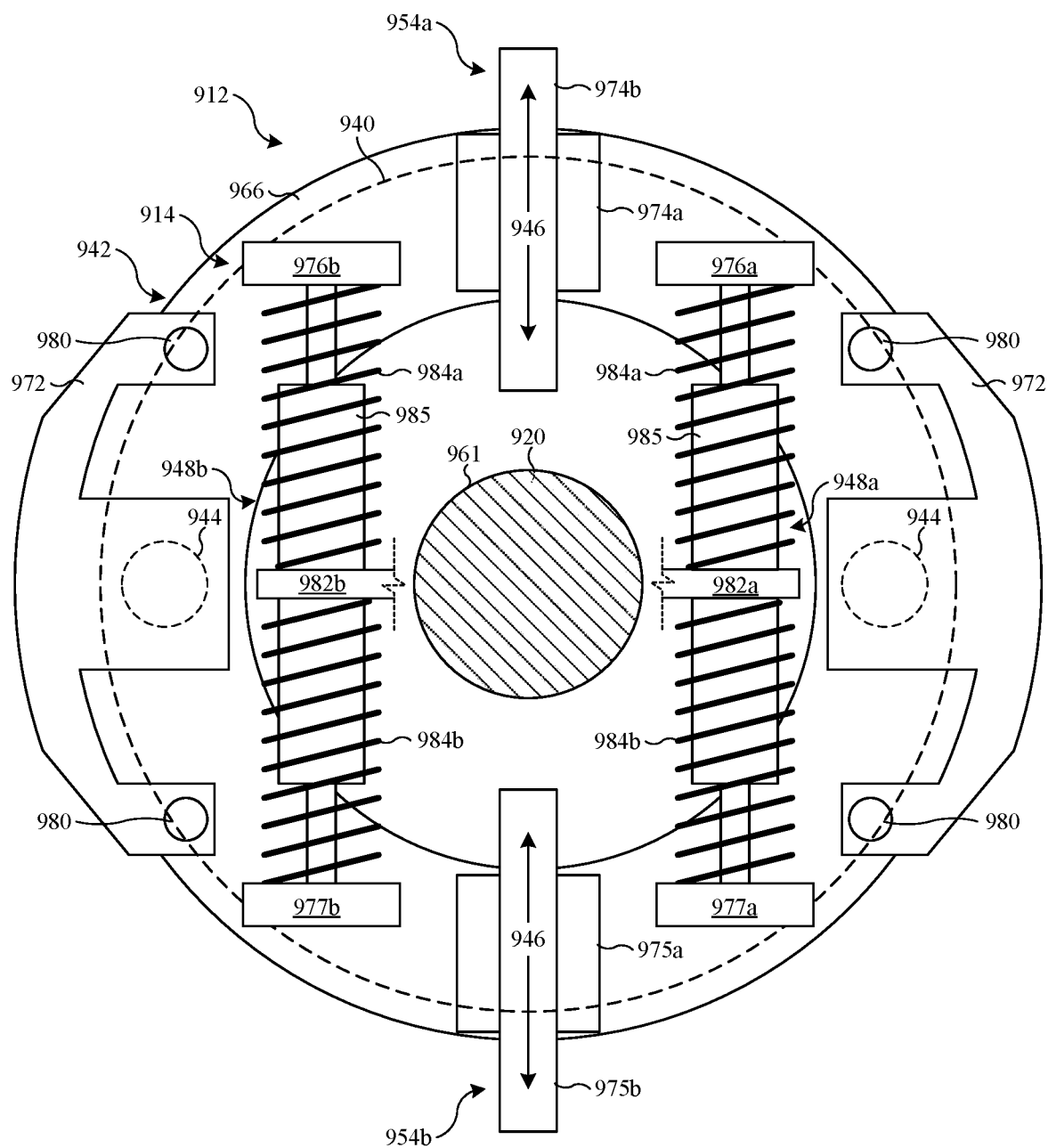
FIG. 9 is a schematic side view illustration that shows a brake system and a mass damper system according to a fourth example implementation.
Figure 10:
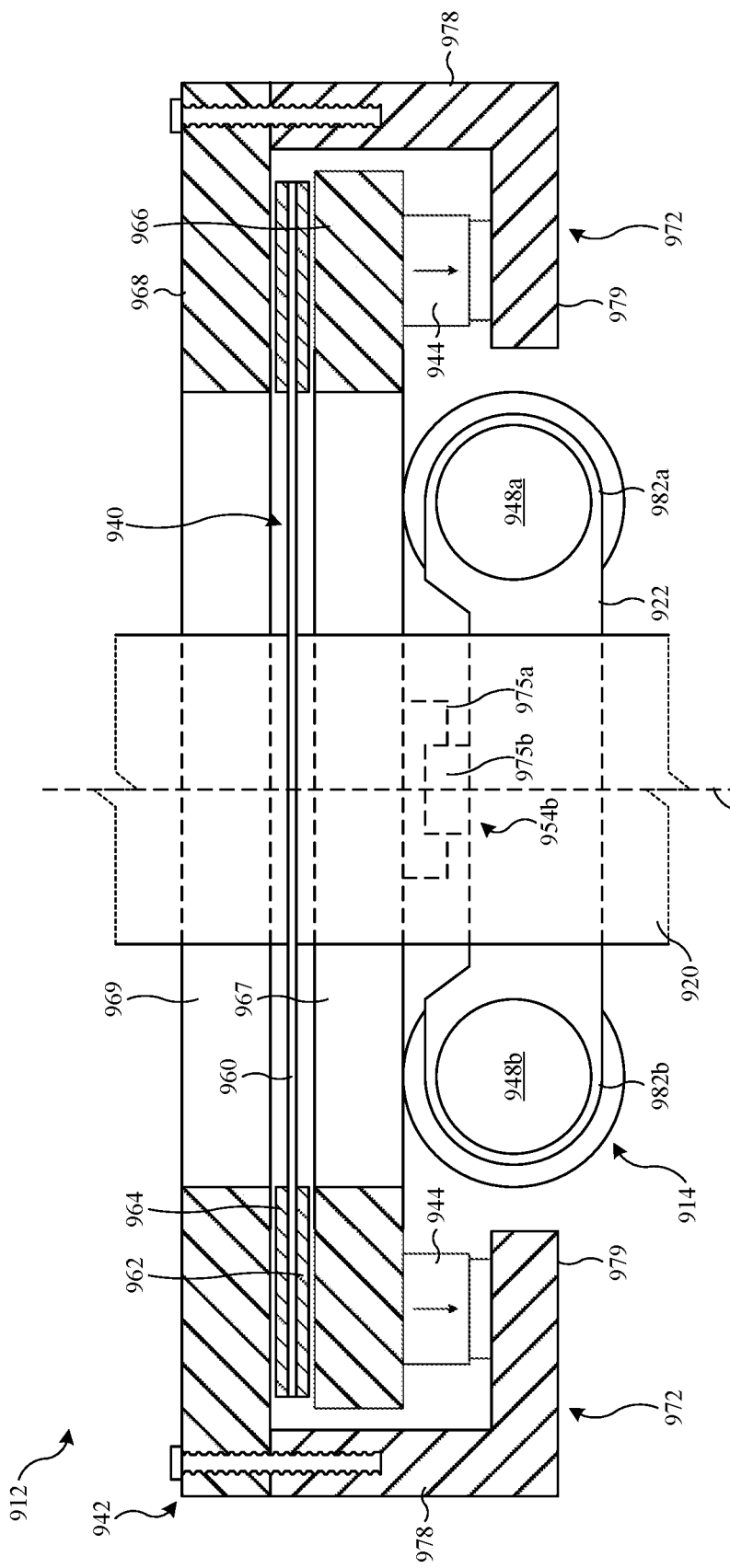
FIG. 10 is a schematic top view cross-section illustration that shows the brake system and the mass damper system according to the fourth example implementation.

FIG. 9 is a schematic side view illustration that shows a brake system 912 and a mass damper system 914 according to a fourth example implementation. FIG. 10 is a schematic top view cross-section illustration that shows the brake system 912 and the mass damper system 914 according to the fourth example implementation. The brake system 912 and the mass damper system 914 may be incorporated in the vehicle 100 in place of the brake system 112 and the mass damper system 114. The description of the brake system 112 and the mass damper system 114 is applicable to the brake system 912 and the mass damper system 914 except as described to the contrary herein.

The brake system 912 includes a brake rotor 940 and a caliper assembly 942. The brake rotor 940 is supported by a wheel hub 920 so that it rotates with a tire of the vehicle, as described with respect to the brake rotor 240, the wheel hub 120, and the tire 118 of the vehicle 100. The brake rotor 940 includes a support disk 960, a first friction pad portion 962, and a second friction pad portion 964.

The support disk 960 is an annular structure that is connected to the wheel hub 920 so that the support disk 960 rotates with the wheel of the vehicle and therefore rotates with respect to the caliper assembly 942, which does not rotate with the wheel of the vehicle. As an example, the support disk 960 may have a central opening 961 and a portion of the wheel hub 920 or a component associated with the wheel hub 920 may pass through the central opening 961 and engage the support disk 960 adjacent to the central opening 961. The support disk 960 and may be movable axially over a limited range with respect to the wheel hub 920 (e.g., by a splined connection of the support disk 960 to the wheel hub 920).

The support disk 960 functions to provide structural support for the first friction pad portion 962 and the second friction pad portion 964. The support disk 960 is formed from a substantially rigid material. As an example, the support disk 960 may be formed from metal.

The first friction pad portion 962 and the second friction pad portion 964 are each annular structures that are connected to and supported by the support disk 960. The first friction pad portion 962 includes a first brake rotor surface that engages the caliper assembly 942 during braking. The second friction pad portion 964 includes a second brake rotor surface that engages the caliper assembly 942 during braking.

The first friction pad portion 962 and the second friction pad portion 964 are each formed from a brake friction material. As an example, the brake friction material may include an organic material and a binder. As an example, the brake friction material may be a non-asbestos organic brake friction material. As an example, the brake friction material may be a semi-metallic brake friction material. As an example, the brake friction material may be a ceramic brake friction material. As an example, the brake friction material may be a sintered metal brake friction material.

The caliper assembly 942 includes a actuators 944, an inner caliper plate 966, an outer caliper plate 968, and connector parts 972 that interconnect the inner caliper plate 966 and the outer caliper plate 968. The caliper assembly 942 is supported by a support structure such as a knuckle 922 so that it does not rotate with the brake rotor 940. The actuators 944, the outer caliper plate 968, and the connector parts 972 are supported by the inner caliper plate 966.

The inner caliper plate 966 is located on a first side of the brake rotor 940, which in this implementation is the inboard side of the brake rotor 940, which is located toward the body structure of the vehicle relative to the brake rotor 940. The inner caliper plate 966 of the caliper assembly 942 is located between the brake rotor 940 and the knuckle 922.

The inner caliper plate 966 is a disk-like structure, but need not have a circular outer periphery, as outer structures (e.g., oval) may be more suitable given that the inner caliper plate 966 (along with the remainder of the caliper assembly 942) translates up and down within the internal space of the wheel. The inner caliper plate 966 has a central opening 967, and the wheel hub 920 extends through the central opening 967. The central opening 967 provides clearance relative to the wheel hub 920 to allow translation of the inner caliper plate 966 with respect to the wheel hub 920. The inner caliper plate 966, including the caliper surface thereof that is engageable with the brake rotor 940 during braking, extends around the central opening 967 in a ring-like configuration so that the caliper surface encircles the central opening 967.

The inner caliper plate 966 is connected to the knuckle 922 by a first linear bearing 954a and by a second linear bearing 954b. The first linear bearing 954a and the second linear bearing 954b allow motion of the caliper assembly 942 along a line of action 946, but restrain the caliper assembly 942 from moving with respect to the knuckle 922 other than according to the line of action 946 (with the exception of relative motion of portions of the caliper assembly 942 for braking). In some implementations, the line of action 946 extends radially with respect to a rotation axis 938 of the wheel hub 920. In some implementations, the line of action 946 is generally vertical (e.g., within fifteen degrees of vertical). Connection of the inner caliper plate 966 to the knuckle 922 by the first linear bearing 954a and the second linear bearing 954b restrains the inner caliper plate 966 from moving in the direction of the rotation axis 938 of the wheel hub 920.

In the illustrated implementation, the first linear bearing 954a and the second linear bearing 954b are aligned vertically. The first linear bearing 954a is located directly above the rotation axis of the wheel hub 920. The second linear bearing 954b is located directly below the rotation axis of the wheel hub 920. The first linear bearing 954a includes a first bearing part 974a and a second bearing part 975a that are linearly slidable with respect to each other. The first bearing part 974a is connected to the inner caliper plate 966 and the second bearing part 975a is connected to the knuckle 922. The second linear bearing 954b includes a first bearing part 974b and a second bearing part 975b that are linearly slidable with respect to each other. The first bearing part 974b is connected to the inner caliper plate 966 and the second bearing part 975b is connected to the knuckle 922.

The inner caliper plate 966 is connected to the knuckle 922 by the mass damper system 914. The mass damper system 914 is a passive suspension component that is configured to damp vibration of a wheel assembly that the mass damper system 914 is incorporated in, such as the wheel assembly 104. The mass damper system 914 damps vibration of the wheel assembly by regulating movement of a damper mass, which in this implementation includes the caliper assembly 942 of the brake system 912 and may also include other components. To connect the inner caliper plate 966 to the mass damper assembly, the inner caliper plate 966 includes a first upper damper mount 976a, a first lower damper mount 977a, a second upper damper mount 976b, and a second lower damper mount 977b.

The outer caliper plate 968 is located on a second side of the brake rotor 940, which in this implementation is the outboard side of the brake rotor 940, which is located away from the body structure of the vehicle relative to the brake rotor 940. The outer caliper plate 968 is a disk-like structure, but need not have a circular outer periphery, as outer structures (e.g., oval) may be more suitable given that the outer caliper plate 968 (along with the remainder of the caliper assembly 942) translates up and down within the internal space of the wheel. The outer caliper plate 968 has a central opening 969, and the wheel hub 920 extends through the central opening 969. The central opening 969 provides clearance relative to the wheel hub 920 to allow translation of the outer caliper plate 968 with respect to the wheel hub 920. The outer caliper plate 968, including the caliper surface thereof that is engageable with the brake rotor 940 during braking, extends around the central opening 969 in a ring-like configuration so that the caliper surface encircles the central opening 969.

The connector parts 972 define a sliding connection of the outer caliper plate 968 with respect to the inner caliper plate 966 and allow the actuators 944 to move the outer caliper plate 968 toward the inner caliper plate 966 to clamp the brake rotor 940 between the inner caliper plate 966 and the outer caliper plate 968 to applying braking forces. In the illustrated implementation, the connector parts 972 are L-shaped structures that include axially extending portions 978 and transversely extending portions 979. The axially extending portions 978 are located near an outer periphery of the caliper assembly 942 and are rigidly connected to the outer caliper plate 968, such as by bolts located at an outer periphery of the outer caliper plate 968 in the illustrated implementation. The axially extending portions 978 extend in the inboard direction from the outer caliper plate 968 past the inner caliper plate 966, where the transversely extending portions 979 are located inboard from the inner caliper plate 966 and extend radially inward toward the wheel hub 920.

To mount the outer caliper plate 968 and the connector parts 972 with respect to the inner caliper plate 966, the connector parts 972 may be slidably mounted to the inner caliper plate 966 by pins 980 that are located at the transversely extending portions 979 of the connector parts 972. This allows the outer caliper plate 968 to slide parallel to the rotation axis of the wheel hub 920. In the illustrated example, the pins 980 are fixed to the connector parts 972 and extend into holes in the inner caliper plate 966. The pins 980 may instead be fixed to the inner caliper plate 966 and extend into holds in the connector parts 972.

The actuators 944 (e.g., a hydraulic actuators or electromechanical actuators) are connected to the inner caliper plate 966 and are positioned between the inner caliper plate 966 and the transversely extending portions 979 of the connector parts 972. The actuators 944 may be actuated to apply force in the inboard direction, which engages the transversely extending portions 979 of the connector parts 972 and consequently causes the outer caliper plate 968 to move in the inboard direction to apply braking forces by clamping of the brake rotor 940 between the inner caliper plate 966 and the outer caliper plate 968.

The configuration of and materials chosen for the inner caliper plate 966 and the inner caliper plate 966 are similar to the configuration and materials of conventional brake rotors. As a result, the caliper assembly 942 has a greater mass than the brake rotor 940 and the caliper assembly 942 has a greater thermal mass than the brake rotor 940. This concentrates the mass of the brake system 912 in the components that are used as the damper mass of the mass damper system 914. As an example, at least part of the inner caliper plate 966 and at least part of the outer caliper plate 968 may be formed from a ferrous material. As an example, the inner caliper plate 966 may include a first caliper surface that is engageable with the brake rotor 940, the outer caliper plate 968 may include a second caliper surface that is engageable with the brake rotor 940, and the first caliper surface and the second caliper surface may be formed from a ferrous material. The ferrous material of the inner caliper plate 966 and the outer caliper plate 968 may be, for example, an iron-based metal or metal alloy. The ferrous material has a much higher thermal conductivity than the thermal conductivity of the brake friction material of the brake rotor 940. The inner caliper plate 966 and the outer caliper plate 968 therefore have a much higher thermal capacity than the brake rotor 940, allowing the inner caliper plate 966 and the outer caliper plate 968 to serve as heat sinks and thereby reduce the heat absorbed by the brake rotor 940.

The mass damper system 914 includes a first damper assembly 948a, a second damper assembly 948b and a damper mass. The caliper assembly 942 is included in the damper mass. Other structures may be included in the damper mass.

The first damper assembly 948a and the second damper assembly 948b regulate motion of the damper mass in order to damp vibrations of a wheel assembly, and may be configured in and operate in the manner described with respect to the damper assembly 248. As an example, each of the first damper assembly 948a and the second damper assembly 948b may include a spring and a damper (e.g., a fluid damper), as previously described. In the illustrated example the first damper assembly 948a and the second damper assembly 948b are located on opposite sides of the wheel hub 920 in the front to rear direction of the vehicle.

In the illustrated example, the first damper assembly 948a is connected to a first knuckle portion 982a of the knuckle 922 and the second damper assembly 948b is connected to a second knuckle portion 982b of the knuckle 922. These connections may be at a vertical midpoint of each of the first damper assembly 948a and the second damper assembly 948b, substantially equidistant from the first upper damper mount 976a and the second upper damper mount 976b relative to the first lower damper mount 977a and the second lower damper mount 977b in the neutral position.

The first damper assembly 948a and the second damper assembly 948b include upper springs 984a, a lower springs 984b, and dampers 985. The upper springs 984a each extend from a respect one of the first knuckle portion 982a or the second knuckle portion 982b to the first upper damper mount 976a or the second upper damper mount 976b. The lower springs 984b each extend from a respect one of the first knuckle portion 982a or the second knuckle portion 982b to the first lower damper mount 977a or the second lower damper mount 977b. This urges the caliper assembly 942 to the neutral position. The first knuckle portion 982a and the second knuckle portion 982b are each connected to one of the dampers 985, for example, in a sliding, collar-like configuration. The dampers are configured to resist translation of the caliper assembly 942 with respect to the knuckle 922 along the action 946, and may be fluid dampers as previously described. In the illustrated implementation, the dampers 985 each have a cylinder that is connected to the first knuckle portion 982a or the second knuckle portion 982b and a double-ended piston rod that extends between the first upper damper mount 976a or the second upper damper mount 976b and the first lower damper mount 977a or the second lower damper mount 977b.

Figure 11:
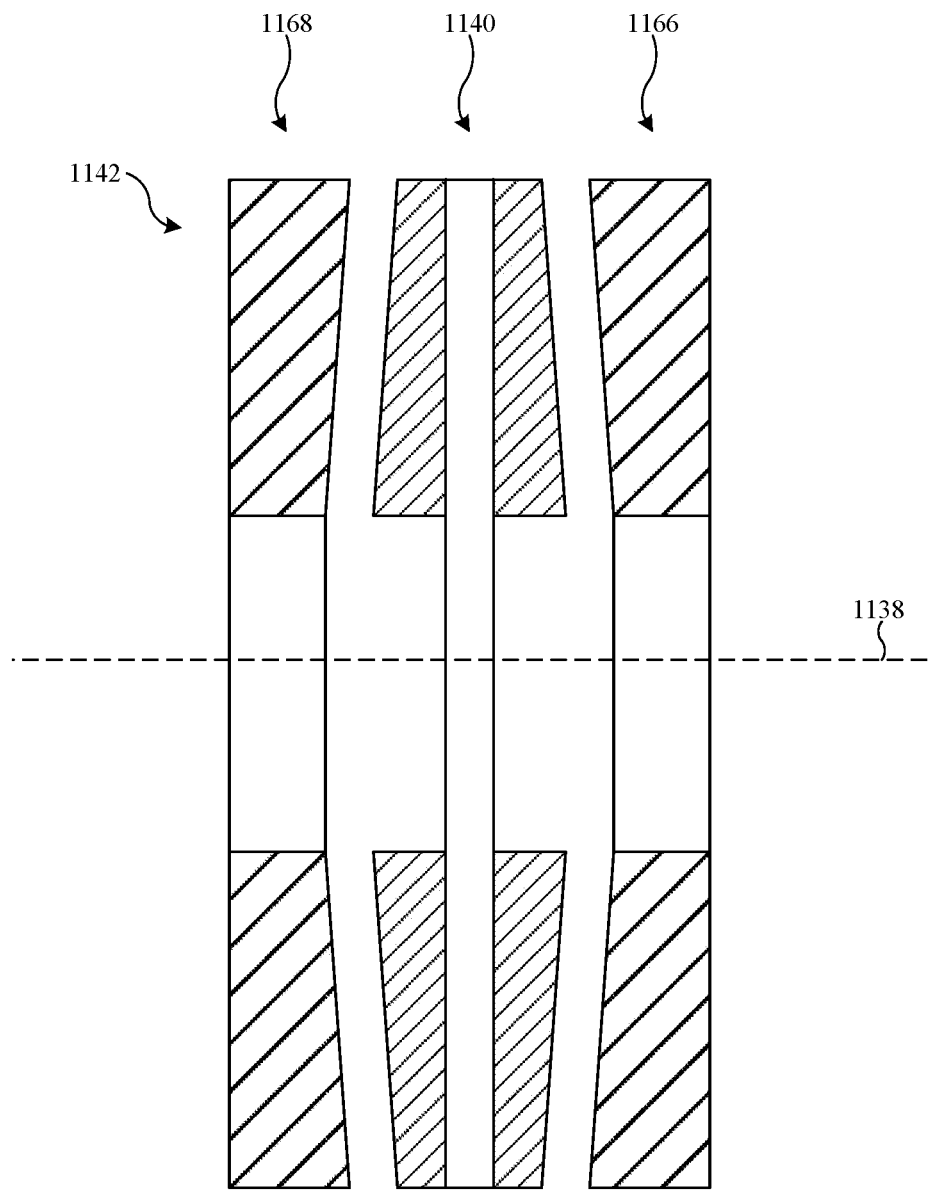
FIG. 11 is a schematic top view cross-section illustration that shows a brake caliper assembly and a rotor having tapered engagement surfaces.

FIG. 11 is a schematic top view cross-section illustration that shows a brake caliper assembly 1142 and a rotor 1140 having tapered engagement surfaces. The brake caliper assembly 1142 and the rotor 1140 may be included in the braking systems described herein to cause the mass damper systems to move to the neutral position during braking. The rotor 1140 is arranged for rotation on a rotation axis 1138 as previously described in the context of other examples. The brake caliper assembly 1142 includes an inner caliper plate 1166 and an outer caliper plate 1168. The inner caliper plate 1166 has a first caliper surface that is engageable with a first rotor surface of the rotor 1140 during braking, and the outer caliper plate 1168 has a second caliper surface that is engageable with a second rotor surface of the rotor 1140 during braking. The first caliper surface, the second caliper surface, the first rotor surface, and the second rotor surface are all tapered, such that they are not flat with respect to a plane constructed perpendicular to the rotation axis 1138, but instead, rise or fall (e.g., linearly) along a line extending in the radial direction when compared to a plane constructed perpendicular to the rotation axis 1138. Thus, for example, the first caliper surface, the second caliper surface, the first rotor surface, and the second rotor surface may all define frustroconical shapes. The first rotor surface is engageable with and complementary to the first caliper surface, and the second rotor surface is engageable with and complementary to the second caliper surface. When engaged, the complementary tapered profiles cause the inner caliper plate 1166 and the outer caliper plate 1168 to shift by engagement with the rotor 1140 according to a cam-like action to center them with respect to the rotor 1140, thereby placing the inner caliper plate 1166 and the outer caliper plate 1168 in the neutral position during braking.

Figure 12:
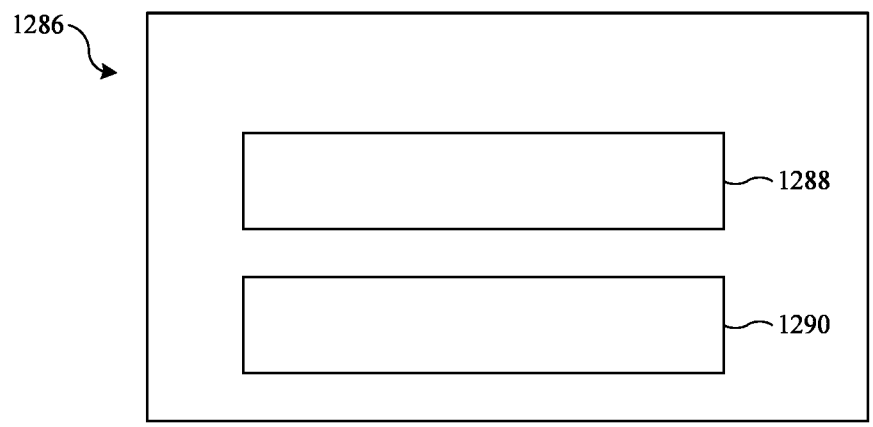
FIG. 12 is a block diagram that shows a mass damper control system according to an example.

FIG. 12 is a block diagram that shows a mass damper control system 1286 according to an example. The mass damper control system 1286 includes a damper locking mechanism 1288 and a controller 1290. The mass damper control system 1286 can be used in conjunction with the mass damper systems described herein to stop movement of the damper mass under certain conditions. The damper locking mechanism 1288 is operable to prevent translation of the damper mass along its line of action. As one example, the damper locking mechanism 1288 may be implemented in the form of an electromechanical lock that is incorporated in linear bearings that support the damper mass to arrest motion of the damper mass. As another example, the damper locking mechanism 1288 may be implemented in the form of a hydraulic circuit in a fluid damper that is selectively closable to restrain motion of the fluid damper. The controller 1290 is configured to determine whether to stop movement of the damper mass. The controller 1290 may be configured to determine whether to stop movement of the damper mass by evaluating one or more conditions. As an example, the controller 1290 may be configured to stop movement of the damper mass upon determining that a speed of the vehicle has gone below a threshold speed value.

Figure 13:
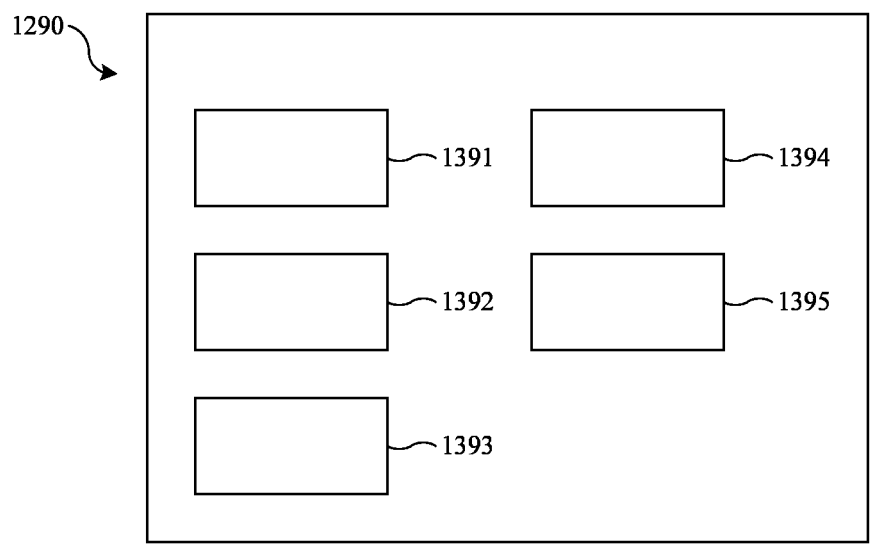
FIG. 13 is a block diagram that shows an example of a controller.

FIG. 13 is a block diagram that shows an example of the controller 1290. The controller 1290 may be used to control a mass damper assembly, as previously described, and may also be used to control other systems, such as a braking system or an active suspension system. The controller 1290 may include a processor 1391, a memory 1392, a storage device 1393, one or more input devices 1394, and one or more output devices 1395. The controller 1290 may include a bus or a similar device to interconnect the components for communication. The processor 1391 is operable to execute computer program instructions and perform operations described by the computer program instructions. As an example, the processor 1391 may be a conventional device such as a central processing unit. The memory 1392 may be a volatile, high-speed, short-term information storage device such as a random-access memory module. The storage device 1393 may be a non-volatile information storage device such as a hard drive or a solid-state drive. The input devices 1394 may include any type of human-machine interface such as buttons, switches, a keyboard, a mouse, a touchscreen input device, a gestural input device, or an audio input device. The output devices 1395 may include any type of device operable to provide an indication to a user regarding an operating state, such as a display screen or an audio output, or any other functional output or control.

As used in the claims, phrases in the form of "at least one of A, B, or C" should be interpreted to encompass only A, or only B, or only C, or any combination of A, B and C.

As described above, one aspect of the present technology is suspension control, which may, in some implementations, include the gathering and use of data available from various sources to customize operation based on user preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information. As one example, information describing a user of the vehicle may be collected and used to adjust the ride of the vehicle based on user preferences. As another example, the vehicle may include sensors that are used to control operation of the vehicle, and these sensors may obtain information (e.g., still pictures or video images) that can be used to identify persons present in the image.

The present disclosure recognizes that the use of such personal information data, in the present technology, can be used to the benefit of users. For example, the personal information data can be used to develop a user profile that describes user comfort levels for certain types of motion of the vehicle.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the identifying content to be displayed to users, the present technology can be configured to allow users to select to "opt in" or "opt out" of participation in the collection of personal information data during registration for services or anytime thereafter. In another example, users can select not to provide personal data for use in suspension control. In yet another example, users can select to limit the length of time personal data is maintained or entirely prohibit the use and storage of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, suspension control can be performed using non-personal information data or a bare minimum amount of personal information, other non-personal information available to the devices, or publicly available information.

What is claimed is:
1. A wheel end assembly comprising:
 a brake rotor comprising:

a support disk having an annular configuration and configured for connection to a wheel for rotation with the wheel about a rotation axis; and a first friction pad portion and a second friction pad portion each having annular configurations and connected to opposing sides of the support disk, wherein the first friction pad portion and the second friction pad portion comprise a brake friction material;

a caliper assembly that is configured for connection to a hub retainer that supports the wheel and configured to move radially with respect to the rotation axis, wherein the caliper assembly is configured to engage the first friction pad portion and the second friction pad portion of the brake rotor to inhibit rotation of the brake rotor and the wheel relative to the hub retainer;

a damper assembly that is configured for connection to the hub retainer and is connected to the caliper assembly, with the damper assembly configured to regulate movement of the caliper assembly with respect to the hub retainer, wherein the caliper assembly and the damper assembly cooperate to define a mass damper system that is configured to damp vibration of the wheel; and a linear bearing, with the caliper assembly configured for connection to the hub retainer by the linear bearing, wherein the linear bearing is configured to restrain movement of the caliper assembly according to a line of action.

2. The wheel end assembly of claim 1, wherein the caliper assembly includes an inner caliper plate and an outer caliper plate, wherein the inner caliper plate is located on a first side of the brake rotor and is configured to engage the first friction pad portion, and wherein the outer caliper plate is located on a second side of the brake rotor and is configured to engage the second friction pad portion.

3. The wheel end assembly of claim 2, wherein the inner caliper plate is configured for connection to the hub retainer by the damper assembly.

4. The wheel end assembly of claim 1, wherein the caliper assembly further includes an actuator and a frame mounted to the outer caliper plate, with the actuator positioned between and connected to the inner caliper plate and the frame, wherein the actuator is configured to move the frame with respect to the inner caliper plate and move the outer caliper plate toward the inner caliper plate to engage the brake rotor.

5. The wheel end assembly of claim 4, wherein the support disk is configured to move along the rotation axis, with the actuator configured to move the outer caliper plate along the rotation axis into engagement with the second friction pad portion and move the brake rotor along the rotation axis to engage the first friction pad portion with the inner caliper plate.

6. The wheel end assembly of claim 1, wherein the line of action is generally vertical.

7. The wheel end assembly of claim 1, wherein the damper assembly includes a spring configured to bias the movement of the caliper assembly with respect to the hub retainer and a damper configured to dampen the movement of the caliper assembly with respect to the hub retainer.

8. The wheel end assembly of claim 1, wherein the brake friction material includes an organic material and a binder.

9. A wheel end assembly comprising:
a brake rotor comprising a first friction pad portion and a second friction pad portion:
a caliper assembly that is configured for connection to a hub retainer that supports the wheel and configured to move radially with respect to the rotation axis, wherein the caliper assembly is configured to engage the first friction pad portion and the second friction pad portion of the brake rotor to inhibit rotation of the brake rotor and the wheel relative to the hub retainer; and a damper assembly that is configured for connection to the hub retainer and is connected to the caliper assembly, with the damper assembly configured to regulate movement of the caliper assembly with respect to the hub retainer, wherein the caliper assembly and the damper assembly cooperate to define a mass damper system that is configured to damp vibration of the wheel, wherein the caliper assembly includes an inner caliper plate and an outer caliper plate, wherein the inner caliper plate is located on a first side of the brake rotor and is configured to engage the first friction pad portion, wherein the outer caliper plate is located on a second side of the brake rotor and is configured to engage the second friction pad portion, and wherein the inner caliper plate and the outer caliper plate each have an annular configuration that extends around a central opening.

10. The wheel end assembly of claim 9, further comprising a linear bearing, with the caliper assembly configured for connection to the hub retainer by the linear bearing, wherein the linear bearing is configured to restrain movement of the caliper assembly according to a line of action.

11. A wheel end assembly comprising:
a brake rotor that is configured for connection to a wheel for rotation with the wheel about a rotation axis;
a caliper assembly that is configured for connection to a hub retainer that supports the wheel and configured to linearly translate radially with respect to the rotation axis; and
a first damper assembly and a second damper assembly that are each configured for connection to the hub retainer and coupled to the caliper assembly, wherein the first damper assembly and the second damper assembly are configured to regulate motion of the caliper assembly with respect to the hub retainer to damp movements of the hub retainer.

12. The wheel end assembly of claim 11, wherein each of the first damper assembly and the second damper assembly includes a spring configured to bias movement of the caliper assembly with respect to the hub retainer and a damper configured to dampen the movement of the caliper assembly with respect to the hub retainer.

13. The wheel end assembly of claim 11, wherein the first damper assembly and the second damper assembly are located on opposite sides of the rotation axis.

14. The wheel end assembly of claim 11, wherein each of the first damper assembly and the second damper assembly includes an upper spring, a lower spring, and a damper, with the upper spring and the lower spring engaging opposing sides of the damper.

15. The wheel end assembly of claim 11, wherein a mass of the caliper assembly is greater than a mass of the brake rotor.

16. The wheel end assembly of claim 11, wherein a thermal mass of the caliper assembly is greater than a thermal mass of the brake rotor.

17. A wheel end assembly comprising:
a brake rotor that is configured for connection to a wheel for rotation with the wheel about a rotation axis;

a caliper assembly that is configured for connection to a hub retainer that supports the wheel and configured to linearly translate radially with respect to the rotation axis;

a damper assembly that is configured for connection to the hub retainer and is connected to the caliper assembly, with the damper assembly configured to regulate movement of the caliper assembly with respect to the hub retainer, wherein the caliper assembly and the damper assembly cooperate to define a mass damper system that is configured to damp vibration of the wheel; and a first linear bearing and a second linear bearing that are each configured for connection to the hub retainer and coupled to the caliper assembly on opposing sides of the rotation axis and configured to restrain the caliper assembly to linear movement with respect to the hub retainer.

18. The wheel end assembly of claim 17, wherein the caliper assembly comprises an inner caliper plate and an outer caliper plate each configured to engage the brake rotor, with the inner caliper plate configured for connection to the hub retainer by the first linear bearing and the second linear bearing.

19. The wheel end assembly of claim 18, wherein the brake rotor is configured to move along the rotation axis, with the outer caliper plate configured to move along the rotation axis into engagement with the brake rotor and move the brake rotor along the rotation axis to engage the inner caliper plate.

20. The wheel end assembly of claim 17, wherein the first linear bearing and the second linear bearing are aligned along a line of action.

* * * * *